(12) United States Patent
Lin et al.

(10) Patent No.: US 12,502,670 B2
(45) Date of Patent: Dec. 23, 2025

(54) MICROFLUIDIC CHIP

(71) Applicant: Shanghai Tianma Micro-Electronics Co., Ltd., Shanghai (CN)

(72) Inventors: Baiquan Lin, Shanghai (CN); Kerui Xi, Shanghai (CN); Yunfei Bai, Shanghai (CN); Wei Li, Shanghai (CN); Dengming Lei, Shanghai (CN); Zhen Liu, Shanghai (CN); Zhenyu Jia, Shanghai (CN); Junting Ouyang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 795 days.

(21) Appl. No.: 17/758,359

(22) PCT Filed: Jun. 30, 2021

(86) PCT No.: PCT/CN2021/103593
§ 371 (c)(1),
(2) Date: Jul. 5, 2022

(87) PCT Pub. No.: WO2022/227268
PCT Pub. Date: Nov. 3, 2022

(65) Prior Publication Data
US 2024/0165616 A1    May 23, 2024

(30) Foreign Application Priority Data
Apr. 27, 2021   (CN) .......................... 202110462149.1

(51) Int. Cl.
*B01L 3/00*   (2006.01)

(52) U.S. Cl.
CPC ....... *B01L 3/50273* (2013.01); *B01L 2200/10* (2013.01); *B01L 2300/0645* (2013.01); *B01L 2400/0427* (2013.01)

(58) Field of Classification Search
None
See application file for complete search history.

(56) References Cited

U.S. PATENT DOCUMENTS

| | | | |
|---|---|---|---|
| 2004/0058450 | A1 | 3/2004 | Pamula et al. |
| 2018/0141049 | A1* | 5/2018 | Jebrail ............ G01N 27/44791 |
| 2019/0291108 | A1 | 9/2019 | Chang et al. |

FOREIGN PATENT DOCUMENTS

| | | | |
|---|---|---|---|
| CN | 102650512 A | * 8/2012 | ........ B01L 3/502792 |
| CN | 107527595 A | 12/2017 | |

(Continued)

OTHER PUBLICATIONS

English translation of CN 109799271A. (Year: 2019).*

(Continued)

*Primary Examiner* — Matthew D Krcha
(74) *Attorney, Agent, or Firm* — KILPATRICK TOWNSEND & STOCKTON LLP

(57) ABSTRACT

Provided is a microfluidic chip. The microfluidic chip includes a first substrate and a second substrate disposed opposite to each other and drive electrodes, first sensing electrodes and second sensing electrodes disposed on a side of the first substrate. A microfluidic channel is formed between the first substrate and the second substrate and configured to accommodate at least one droplet. Different drive voltage signals are applied to adjacent drive electrodes, so as to drive the at least one droplet to move. Detection signals are applied to the first sensing electrodes and the second sensing electrodes, and a position of the at least one droplet is determined according to a change in capacitance between one first sensing electrode and an electrode corresponding thereto and a change in capacitance between one second sensing electrode and an electrode corresponding thereto when the at least one droplet flows by.

18 Claims, 16 Drawing Sheets

(56) References Cited

FOREIGN PATENT DOCUMENTS

| CN | 107754962 A | | 3/2018 | |
|---|---|---|---|---|
| CN | 109174219 A | * | 1/2019 | .......... B01L 3/50273 |
| CN | 109420532 A | * | 3/2019 | ............ B01L 3/5027 |
| CN | 109799271 A | * | 5/2019 | ........ B01L 3/502715 |
| CN | 109876875 A | | 6/2019 | |
| CN | 109894169 A | * | 6/2019 | .......... B01F 13/0076 |

OTHER PUBLICATIONS

English translation of CN 102650512A. (Year: 2012).*
English translation of CN 109894169A. (Year: 2019).*
English translation of CN 109420532A (Year: 2019).*

* cited by examiner

MICROFLUIDIC CHIP

CROSS-REFERENCE TO RELATED APPLICATIONS

This is a National Stage Application filed under 35 U.S.C. 371 based on International Patent Application No. PCT/CN2021/103593, filed on Jun. 30, 2021, which claims priority to Chinese Patent Application No. 202110462149.1 filed on Apr. 27, 2021, the disclosures of both of which are incorporated herein by reference in their entireties.

FIELD

Embodiments of the present application relate to the field of microfluidics technology and, for example, to a microfluidic chip.

BACKGROUND

Microfluidics technology refers to a technology that uses micro-channels (tens to hundreds of microns in dimension) to process or manipulate microscopic fluids (volumes ranging from nanoliter to attoliter). A microfluidic chip is a main platform for achieving the microfluidics technology. The microfluidic chip has characteristics of parallel collection and processing of samples, high integration, high throughput, fast analysis speed, low power consumption, low material consumption, and low pollution. The microfluidic chip technology may be applied to biological genetic engineering, disease diagnosis and drug research, cell analysis, environmental monitoring and protection, health quarantine, forensic identification and other fields.

When the surface of a drive unit driving a droplet to move is uneven or contains impurities due to raw material, process or environmental problems, a droplet motion state is affected. Since drive timing is determined in advance, if no droplet position feedback mechanism exists, the subsequent process is affected, to reduce the efficiency of the experiment and even causing the experiment to fail. Especially in experiments with relatively complicated droplet moving paths, real-time feedback of the droplet position is more important.

In the microfluidics technology in the related art, it is usually difficult to feed back the droplet position in real time. Some literatures mention that the droplet position may be obtained by optical detection, but in this method, an external laser device usually needs to be equipped, which is complicated in structure, difficult for on-site real-time diagnosis, and has a relatively high cost.

SUMMARY

Embodiments of the present application provide a microfluidic chip. The microfluidic chip may acquire a position of a droplet while driving the droplet to move, to solve the problem of low reliability of a device due to the inability to detect the position of the droplet in the related art.

In one embodiment of the present application provides a microfluidic chip. The microfluidic chip includes a first substrate and a second substrate disposed opposite to each other, where a microfluidic channel is formed between the first substrate and the second substrate and configured to accommodate at least one droplet.

A plurality of drive electrodes, a plurality of first sensing electrodes and a plurality of second sensing electrodes disposed on a side of the first substrate are included, where the plurality of drive electrodes are arranged in an array, the plurality of first sensing electrodes extend along a first direction and are arranged along a second direction, the plurality of second sensing electrodes extend along the second direction and are arranged along the first direction, the first direction is parallel to a row direction of the array where the plurality of drive electrodes are arranged, the second direction is parallel to a column direction of the array where the plurality of drive electrodes are arranged, a projection of each of the plurality of first sensing electrodes on a plane where the first substrate is located at least partially overlaps with a projection of a slit of two adjacent rows of the plurality of drive electrodes on the plane where the first substrate is located, and a projection of each of the plurality of second sensing electrodes on the plane where the first substrate is located at least partially overlaps with a projection of a slit of two adjacent columns of the plurality of drive electrodes on the plane where the first substrate is located.

Different drive voltage signals are applied to adjacent ones of the plurality of drive electrodes, to drive the at least one droplet to move.

Detection signals are applied to the plurality of first sensing electrodes and the plurality of second sensing electrodes, and a position of the at least one droplet is determined according to a change in capacitance between one of the plurality of first sensing electrodes and an electrode corresponding to the one of the plurality of first sensing electrodes and a change in capacitance between one of the plurality of second sensing electrodes and an electrode corresponding to the one of the plurality of second sensing electrodes when the at least one droplet flows by.

In one embodiment of the present application further provides a microfluidic chip. The microfluidic chip includes a first substrate and a second substrate disposed opposite to each other, where a microfluidic channel is formed between the first substrate and the second substrate and configured to accommodate at least one droplet.

A plurality of drive electrodes disposed on a side of the first substrate are included, where the plurality of drive electrodes are arranged in an array, and different drive voltage signals are applied to adjacent ones of the plurality of drive electrodes, to drive the at least one droplet to move.

At least one edge of each of the plurality of drive electrodes extends in a curved shape.

In one embodiment of the present application further provides a microfluidic chip. The microfluidic chip includes a first substrate and a second substrate disposed opposite to each other, where a microfluidic channel is formed between the first substrate and the second substrate and configured to accommodate at least one droplet.

A plurality of drive electrodes disposed on a side of the first substrate are included, where the plurality of drive electrodes are arranged in an array, and different drive voltage signals are applied to adjacent ones of the plurality of drive electrodes, to drive the at least one droplet to move.

The microfluidic chip further includes a plurality of scan signal lines extending along a first direction, a plurality of data signal lines extending along a second direction, and a plurality of transistors in a one-to-one correspondence with the plurality of drive electrodes, where a gate of each of the plurality of transistors is connected to one of the plurality of scan signal lines, a first pole of each of the plurality of transistors is connected to one of the plurality of data signal lines, and a second pole of each of the plurality of transistors is connected to a respective one of the plurality of drive electrodes.

The plurality of scan signal lines, the plurality of data signal lines, and the plurality of transistors are all disposed on a side of the plurality of drive electrodes farther away from the second substrate.

At least one of each of the plurality of scan signal lines, each of the plurality of data signal lines, or each of the plurality of transistors overlaps with one of the plurality of drive electrodes.

DETAILED DESCRIPTION

Hereinafter the present application is described in detail in conjunction with the drawings and embodiments.

Terms used in the embodiments of the present application are merely used to describe the specific embodiments and not intended to limit the present application. It is to be noted that spatially related terms, including "on", "below", "left" and "right" described in the embodiments of the present application, are described from the perspective of the drawings and are not to be construed as a limitation to the embodiments of the present application. In addition, in the context, it is to be understood that when a component is formed "on" or "below" another component, the component may not only be directly formed "on" or "below" another component and may also be indirectly formed "on" or "below" another component via an intermediate component. Terms "first", "second" and the like are merely used for description and distinguishing between different components rather than indicating any order, quantity, or importance.

The research of the microfluidic chip began in the early 1990s. The microfluidic chip is a potential technology to achieve Lab-on-a-chip and can integrate basic operation units such as sample preparation, reaction, separation and detection in the biological, chemical and medical analysis processes into a micro-scale chip, a network is formed by a micro-channel, and the controllable fluid runs through the whole system, to replace various functions of conventional biological or chemical laboratories and automatically complete the whole process of analysis. Due to the great potential in integration, automation, portability, and high efficiency, the microfluidic chip technology has become a current research hotspot and one of the world's cutting-edge technologies. In the past two decades, the digital microfluidic chip has shown a booming trend in laboratory research and industrial applications, especially the digital microfluidic chip based on microdroplet manipulation has made great progress. The volume of a manipulated droplet may reach the microliter or even nanoliter level at the micro scale, the microliter and nanoliter level droplet may be mixed more accurately, and the chemical reaction inside the droplet is more sufficient. In addition, different biochemical reaction processes inside the droplet may be monitored, and the microdroplet may contain cells and biomolecules, such as proteins and DNA, to enable higher-throughput monitoring. Among many methods for driving the microdroplet, in the traditional method, the generation and control of the microdroplet are achieved in the micro-channel. However, the manufacturing process of the micro-channel is rather complicated, the micro-channel is easily blocked, the reusability is not high, and complicated peripherals are required for driving.

Figure 1:
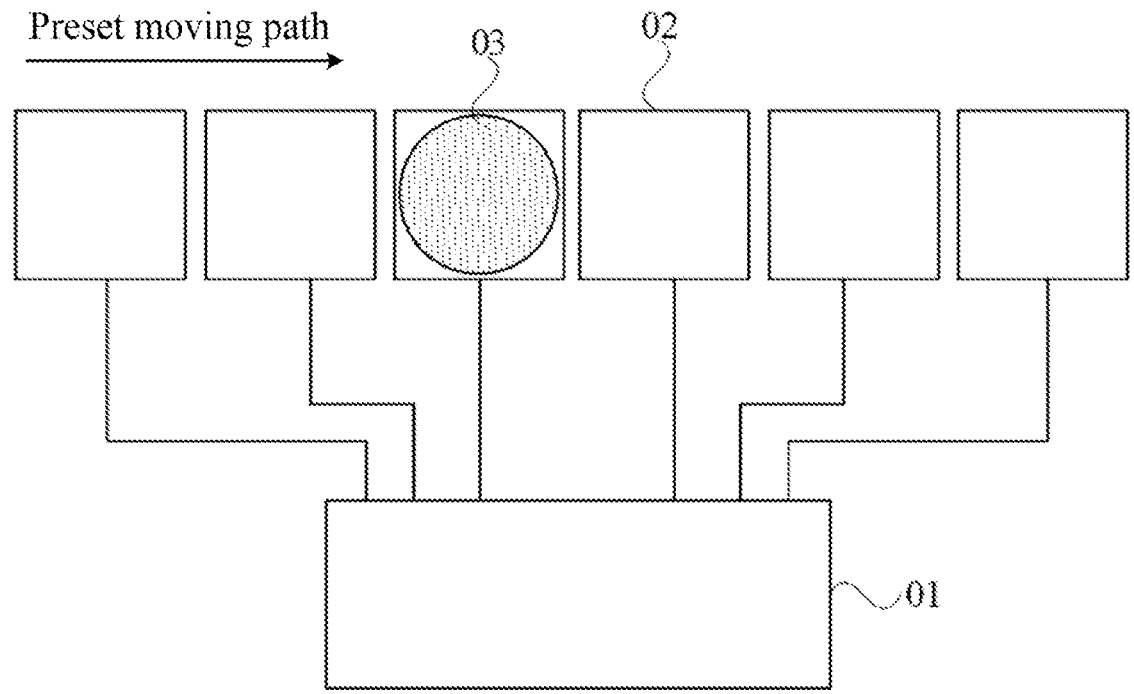
FIG. 1 is a structural diagram of a microfluidic chip in the related art.
Figure 2:
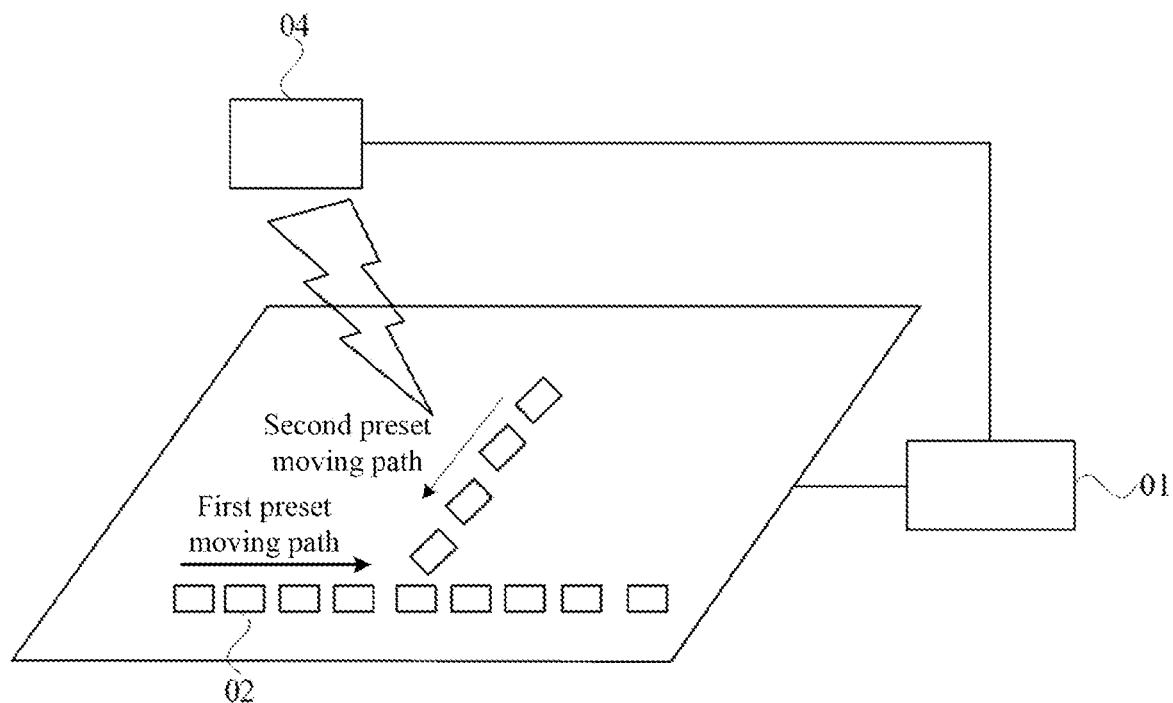
FIG. 2 is a structural diagram of another microfluidic chip in the related art.

With many advantages, the dielectric wetting effect is increasingly used for manipulating microdroplets in the digital microfluidic chip. Since the microfluidic chip based on dielectric wetting does not require complicated equipment such as micro-channels, micropumps and microvalves, the manufacturing process is simple, the heat generation is small, the response is fast, the power consumption is low, and the packaging is simple. The microfluidic chip based on the dielectric wetting effect may achieve the distribution, separation, transportation and merging of the microdroplets. However, the digital microfluidic chip based on dielectric wetting use electrodes as control units to manipulate droplets, so a large number of electrode units are required. Exemplarily, FIG. 1 is a structural diagram of a microfluidic chip in the related art. Referring to FIG. 1, the microfluidic chip includes a control circuit 01 and multiple drive units 02, and each drive unit 02 is electrically connected to the control circuit 01 and configured to drive a droplet 03 to flow according to a preset moving path. This microfluidic chip has characteristics of a simple structure and low costs, but this microfluidic chip cannot feedback a position of the droplet in real time, to limit application scenarios. FIG. 2 is a structural diagram of another microfluidic chip in the related art. Referring to FIG. 2, the microfluidic chip includes a control circuit 01, multiple drive units 02, and a laser head 04. The drive units 02 and the laser head 04 are all electrically connected to the control circuit 01, the drive units 02 are configured to drive the droplet to move, the laser head 04 emits a laser beam for detecting the position of the droplet, and the optical detection method is used for achieving the droplet positioning. This microfluidic chip is complicated in structure, difficult for on-site real-time diagnosis, and has a relatively high cost.

An embodiment of the present application provides a microfluidic chip. The microfluidic chip includes a first substrate and a second substrate disposed opposite to each other and multiple drive electrodes, multiple first sensing electrodes, and multiple second sensing electrodes disposed on a side of the first substrate. A microfluidic channel is formed between the first substrate and the second substrate and configured to accommodate at least one droplet. The multiple drive electrodes are arranged in an array. The multiple first sensing electrodes extend along a first direction and are arranged along a second direction. The multiple second sensing electrodes extend along the second direction and are arranged along the first direction. The first direction is parallel to a row direction of the array formed by the multiple drive electrodes. The second direction is parallel to a column direction of the array formed by the multiple drive electrodes. A projection of each of the multiple first sensing electrodes on a plane where the first substrate is located at least partially overlaps with a projection of a slit of two adjacent rows of drive electrodes on the plane where the first substrate is located. A projection of each of the multiple second sensing electrodes on the plane where the first substrate is located at least partially overlaps with a projection of a slit of two adjacent columns of drive electrodes on the plane where the first substrate is located. Different drive voltage signals are applied to adjacent drive electrodes, to drive the droplet to move. Detection signals are applied to the multiple first sensing electrodes and the multiple second sensing electrodes, and a position of the droplet is determined according to a change in capacitance between the first sensing electrode and an electrode corresponding to the first sensing electrode and a change in capacitance between the second sensing electrode and an electrode corresponding to the second sensing electrode when the droplet flows by.

Both the first substrate and the second substrate may be glass substrates, a sealant is arranged between the first substrate and the second substrate to form at least one microfluidic channel for accommodating the droplet for the droplet to move, and the drive electrodes may be configured to be bulk electrodes arranged on the first substrate in an array and may be formed by metal oxides (for example, indium tin oxide (ITO)). An area of one drive electrode is less than an area of a projection of the droplet on the first substrate. When the droplet is driven to move, different drive voltages are applied to adjacent drive electrodes, and the droplet is driven by a differential voltage between the adjacent drive electrodes and controlled to move according to a preset path. Since the drive electrodes are arranged in an array and discretely, electrodes may be arranged between the drive electrodes to form capacitors. When the droplet flows by, a capacitance of the capacitor changes and the position of the droplet is acquired. In the some embodiments of the present application, the first sensing electrodes extending along the first direction (the row direction of the drive electrode array) and the second sensing electrodes extending along the second direction (the column direction of the drive electrode array) are disposed on the first substrate, where at least part of the first sensing electrode is disposed in the slit between two adjacent rows of drive electrodes, and at least part of the second sensing electrode is disposed in the slit between two adjacent columns of drive electrodes, instead of being completely below the drive electrodes, to prevent the drive electrodes from shielding signals of the sensing electrodes. When the position of the droplet is detected, corresponding voltages are applied to both the first sensing electrode and the second sensing electrode; the first sensing electrode and a certain electrode in the microfluidic chip form a first capacitor, and the second sensing electrode and an electrode in the microfluidic chip form a second capacitor. A certain electrode may be a common electrode disposed on the second substrate, a trace in the first substrate, or an electrode of other capacitors, or the first sensing electrode and the second sensing electrode may be two electrodes of a same capacitor as long as an electrode and a corresponding sensing electrode form a capacitor. When the droplet flows by through a position, due to the influence of the droplet, a size of the first capacitor and a size of the second capacitor at the position change, and the changes of the capacitors are detected to acquire the position of the droplet.

In some embodiments of the present application, a microfluidic channel is formed between the first substrate and the second substrate and configured to accommodate at least one droplet; multiple drive electrodes are disposed on a side of the first substrate in an array, and different drive voltage signals are applied to adjacent drive electrodes, to drive the droplet to move; multiple first sensing electrodes and multiple second sensing electrodes are disposed on a side of the first substrate, detection signals are applied to the multiple first sensing electrodes and the multiple second sensing electrodes, and a position of the droplet is determined according to a change in capacitance between the first sensing electrode and an electrode corresponding to the first sensing electrode and a change in capacitance between the second sensing electrode and an electrode corresponding to the second sensing electrode when the droplet flows by. In this manner, the position of the droplet may be acquired while the droplet is driven to move and the problem of low reliability of a device due to the inability to detect the position of the droplet in the related art is solved.

The embodiments of the present application are described clearly and completely hereinafter in conjunction with the drawings in the embodiments of the present application.

Figure 3:
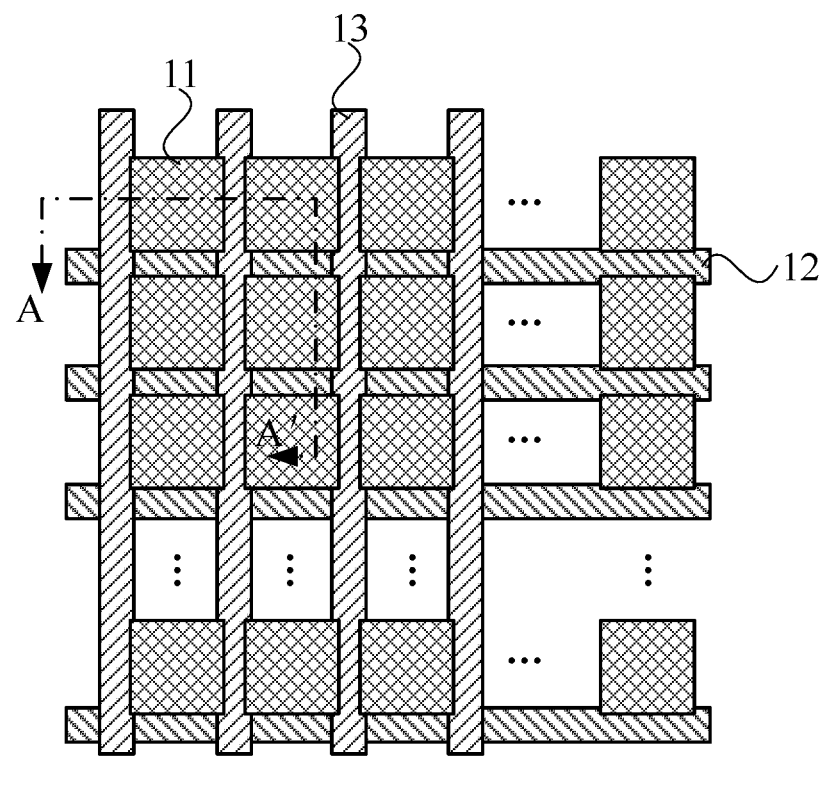
FIG. 3 is a structural diagram of a microfluidic chip according to an embodiment of the present application.
Figure 4:
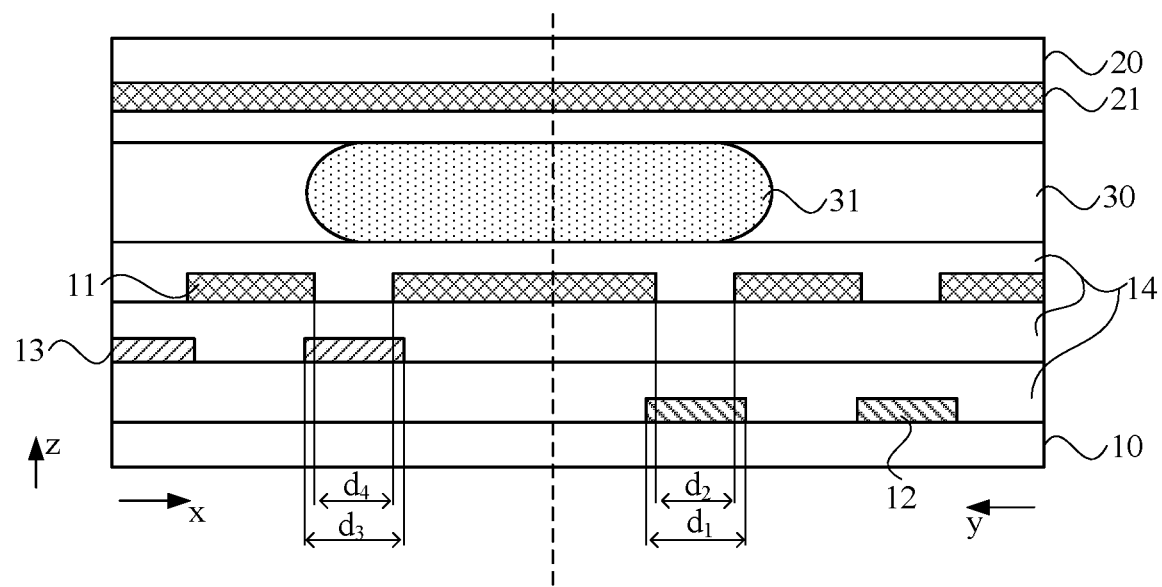
FIG. 4 is a sectional diagram taken along line AN of FIG. 3.

Exemplarily, FIG. 3 is a structural diagram of a microfluidic chip according to an embodiment of the present application, and FIG. 4 is a sectional diagram taken along line AN of FIG. 3. FIG. 3 shows a top diagram of the microfluidic chip. The microfluidic chip includes multiple drive electrodes 11, multiple first sensing electrodes 12, and multiple second sensing electrodes 13, where the multiple drive electrodes 11 are arranged in an array, different drive voltages are applied to adjacent drive electrodes 11, and the droplet is driven by a differential voltage between adjacent drive electrodes 11 and controlled to move according to a preset path. The first sensing electrodes 12 extend along a first direction x and are arranged along a second direction y, the second sensing electrodes 13 extend along the second direction y and are arranged along the first direction x, the first direction x is parallel to a row direction of the array formed by the drive electrodes 11, and the second direction y is parallel to a column direction of the array formed by the drive electrodes 11. The case where the drive electrodes 11, the first sensing electrodes 12, and the second sensing electrodes 13 are all rectangles shown in FIG. 3 is only schematic, which may be set according to actual conditions during specific implementation. Referring to FIG. 4, the microfluidic chip includes a first substrate 10 and a second substrate 20 disposed opposite to each other, a microfluidic channel 30 is formed between the first substrate and the second substrate 20 and configured to accommodate at least one droplet 31. Exemplarily, in this embodiment, the drive electrodes 11, the first sensing electrodes 12, and the second sensing electrodes 13 are all disposed on a side of the first substrate 10 facing toward the second substrate 20, insulating layers 14 are disposed between different electrode layers, a direction z points to the second substrate 20 along the first substrate 10, the first sensing electrodes 12 cover the slit of two adjacent rows of drive electrodes 11, and the second sensing electrodes 13 cover the slit of two adjacent columns of drive electrodes 11. That is, in the embodiment in FIG. 4, a width $d_1$ of the first sensing electrode 12 is greater than a width $d_2$ of the slit between two adjacent rows of drive electrodes 11, and a width $d_3$ of the second sensing electrode 13 is greater than a width $d_4$ of the slit between two adjacent columns of drive electrodes 11. The width of the first sensing electrode 12 and the width of the second sensing electrode 13 are relatively large, which is conducive to reducing the resistance of the first sensing electrode 12 and the second sensing electrode 13 and reducing a voltage drop when detection signals are applied. In other embodiments, the width of the first sensing electrode 12 may also be less than or equal to the width of the slit between two adjacent rows of drive electrodes 11, and the width of the second sensing electrode 13 is less than or equal to the width of the slit between two adjacent columns of drive electrodes 11, which may be designed according to actual conditions during specific implementation. The width of sensing electrodes and the width of the slit between drive electrodes are not limited in the embodiments of the present application. FIG. 4 exemplarily shows that a common electrode 21 is further provided on a side of the second substrate 20. The common electrode 21 may be formed by ITO. When detection signals are applied to the first sensing electrode 12 and the second sensing electrode 13, the first sensing electrode 12 and the common electrode 21 form a first capacitor C1, and the second sensing electrode 13 and the common electrode 21 form a second capacitor C2. When the droplet flows by, a dielectric constant between the sensing electrode and the common electrode changes, the capacitor between the first sensing electrode 12 and the common electrode 21 becomes C1', and the capacitor between the second sensing electrode 13 and the common electrode 21 becomes C2', to determine the position of the droplet. In other embodiments, another electrode that forms a capacitor with the sensing electrode may also be a trace in the microfluidic chip or an electrode of other capacitors, which may be designed according to actual conditions during specific implementation.

Figure 5:
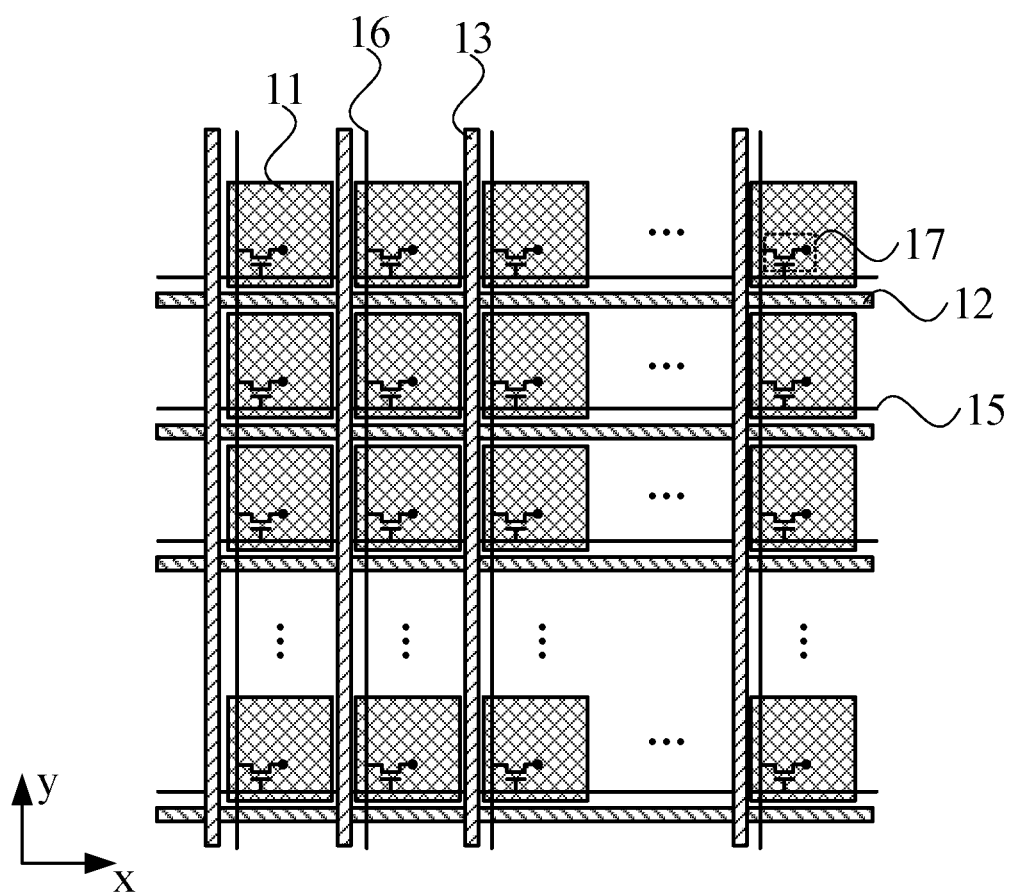
FIG. 5 is a structural diagram of a circuit of a microfluidic chip according to an embodiment of the present application.

FIG. 5 is a structural diagram of a circuit of a microfluidic chip according to an embodiment of the present application. Referring to FIG. 5, the microfluidic chip provided in this embodiment further includes multiple scan signal lines 15 extending along the first direction x, multiple data signal lines 16 extending along the second direction y, and multiple transistors 17 in a one-to-one correspondence with the multiple drive electrodes 11, where a gate of each transistor 17 is connected to one scan signal line 15, a first pole of each transistor 17 is connected to one data signal line 16, and a second pole of each transistor 17 is connected to a respective drive electrode 11.

It is to be understood that, for a microfluidic chip with a large number of drive electrodes and a relatively complicated structure, an active driving method including the scan signal lines 15, the data signal lines 16 and the transistors 17 may be provided. Similar to a display panel, each drive electrode 11 is similar to one sub-pixel in the display panel, the scan signal lines 15 and the data signal lines 16 are used for scanning, and the active driving of the drive electrodes 11 is achieved through the on-off of the transistors 17, where the first pole of the transistor 17 may be a source, the second pole may be a drain, and the transistor 17 may be a thin film transistor. For example, a thin film transistor formed with amorphous silicon material, polysilicon material or metal oxide material as an active layer may be adopted.

In one embodiment, the scan signal lines, the data signal lines, and the transistors are all disposed on a side of the drive electrodes farther away from the second substrate; and at least one of the scan signal line, the data signal line, or the transistor overlaps with the drive electrode.

Figure 6:
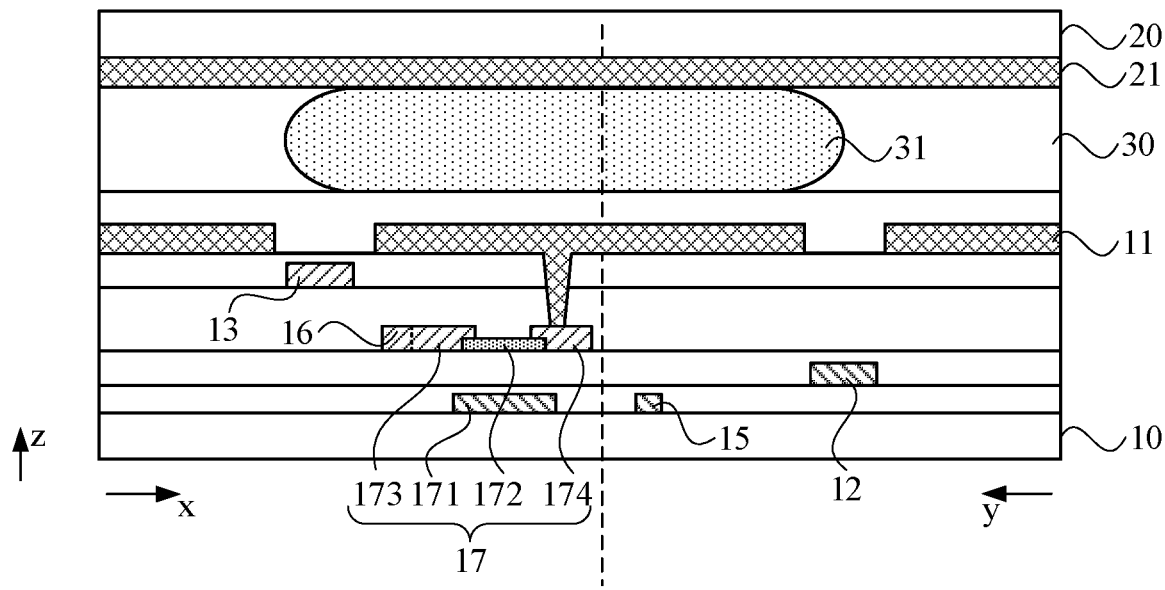
FIG. 6 is a sectional diagram of a microfluidic chip according to an embodiment of the present application.

Exemplarily, FIG. 6 is a sectional diagram of a microfluidic chip according to an embodiment of the present application. Referring to FIG. 6, the transistor 17 includes a gate 171, an active layer 172, a source 173 (a first pole), and a drain 174 (a second pole), and the scan signal line 15, the data signal line 16 and the transistor 17 are all disposed on a side of the drive electrode 11 farther away from the second substrate 20. In this embodiment, since the first sensing electrode 12 and the second sensing electrode 13 need to be at least partially disposed in the slit between the drive electrodes 11, to ensure the strength of the positioning signal and reduce the signal interference, at least one of the scan signal line 15 or the data signal line 16 is not routed in the slit between the drive electrodes 11 and is located below the drive electrodes 11. Correspondingly, the transistor 17 is also disposed below the drive electrodes 11 and not in the slit. In this manner, the drive electrodes 11 may shield the parasitic capacitance caused by the scan signal line 15, the data signal line 16 or the transistor 17, to improve the positioning accuracy of the droplet.

It is to be understood that, in the sectional structure shown in FIG. 6, the shape of the section line is similar to the broken line AA' in FIG. 3, where the section line on the left side of a dashed line extends along the first direction x (the row direction of the drive electrode array), the section line on the right side of the dashed line extends along the second direction y (the column direction of the drive electrode array), and the scan signal line 15 is connected to the gate 171 of the transistor 17. Since the structure of a position where the scan signal line 15 is connected to the gate 171 is not shown in FIG. 6, the scan signal line 15 and the gate 171 in FIG. 6 are separate structures, the data signal line 16 is connected to the source 173 of the transistor 17, and FIG. 6 shows that the data signal line 16 and the source 173 are connected as one integrated structure.

Figure 7:
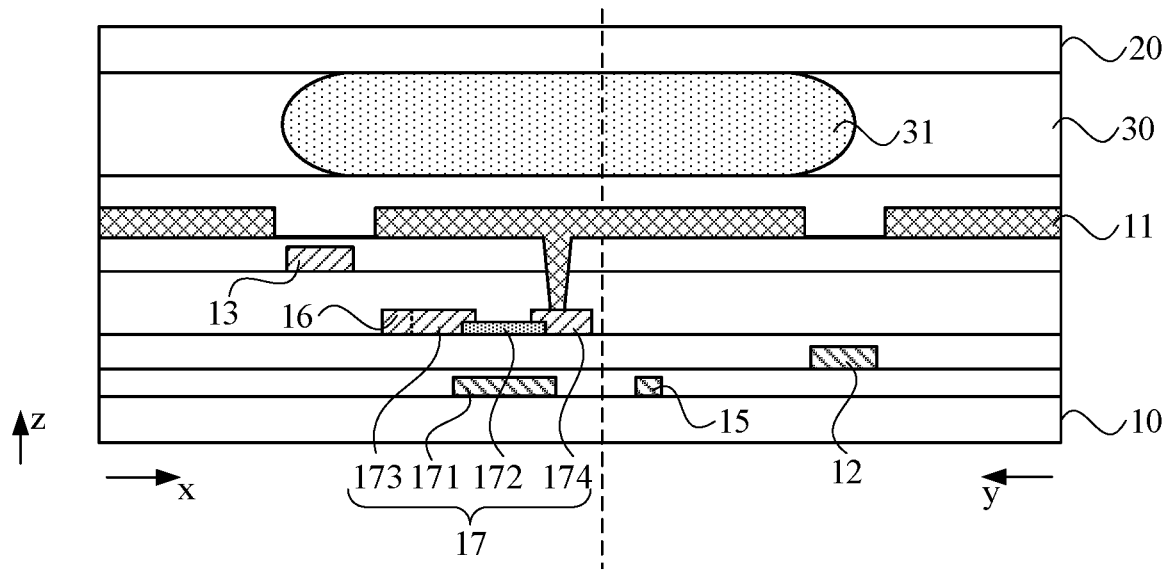
FIG. 7 is a sectional diagram of another microfluidic chip according to an embodiment of the present application.

In the embodiment shown in FIG. 6, a common electrode 21 is further provided on a side of the second substrate 20. When detection signals are applied to the first sensing electrode 12 and the second sensing electrode 13, the first sensing electrode 12 and the common electrode 21 form a first capacitor C1, and the second sensing electrode 13 and the common electrode 21 form a second capacitor C2. When the droplet flows by, a dielectric constant between the sensing electrode and the common electrode changes, the capacitor between the first sensing electrode 12 and the common electrode 21 becomes C1', and the capacitor between the second sensing electrode 13 and the common electrode 21 becomes C2', to determine the position of the droplet. In other embodiments, the common electrode may not be provided, and the sensing electrode and a trace or other electrodes in the microfluidic chip form a capacitor. Exemplarily, FIG. 7 is a sectional diagram of another microfluidic chip according to an embodiment of the present application. It is to be understood that the driving of the droplet to move and the detection of the position of the droplet are generally performed at different times. In this embodiment, when detection signals are applied to the first sensing electrodes 12 and the second sensing electrodes 13, the first sensing electrode 12 and the scan signal line 15 (in other embodiments, other signal lines or electrodes, which is not limited in the embodiments of the present application) may form a third capacitor C3, and the second sensing electrode 13 and the data signal line 16 (in other embodiments, other signal lines or electrodes, which is not limited in the embodiments of the present application) form a fourth capacitor C4. When the droplet flows by, the induced charge distribution in the droplet is changed due to the effect of the sensing electrode and the capacitor between the first sensing electrode 12 and the scan signal line 15 becomes C3' and the capacitor between the second sensing electrode 13 and the data signal line 16 becomes C4', to determine the position of the droplet according to the change of the capacitors. A principle of the embodiment below where the common electrode is not shown is similar to that of FIG. 7.

Figure 8:
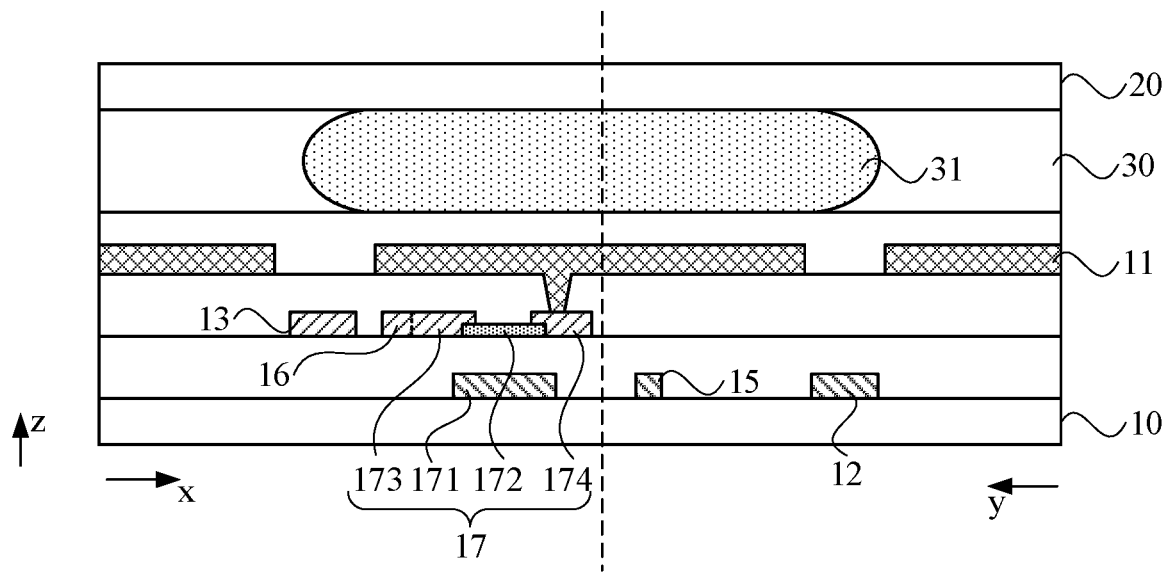
FIG. 8 is a sectional diagram of another microfluidic chip according to an embodiment of the present application.

FIG. 8 is a sectional diagram of another microfluidic chip according to an embodiment of the present application. Referring to FIG. 8, the first sensing electrodes 12 and the scan signal lines are disposed in a same layer, and the second sensing electrodes 13 and the data signal lines 16 are disposed in a same layer.

Since an extension direction of the first sensing electrodes 12 is the same as an extension direction of the scan signal lines 15, and an extension direction of the second sensing electrodes 13 is the same as an extension direction of the data signal lines 16, to reduce film layers of the microfluidic chip, the first sensing electrodes 12 and the scan signal lines 15 may be disposed in the same layer, and the second sensing electrodes 13 and the data signal lines 16 may be disposed in the same layer. During preparation, the first sensing electrodes 12 and the scan signal lines 15 may be formed at one time by a same process, and the second sensing electrodes 13 and the data signal lines 16 may be formed at one time by a same process, to reduce a thickness of the microfluidic chip and the preparation cost.

Figure 9:
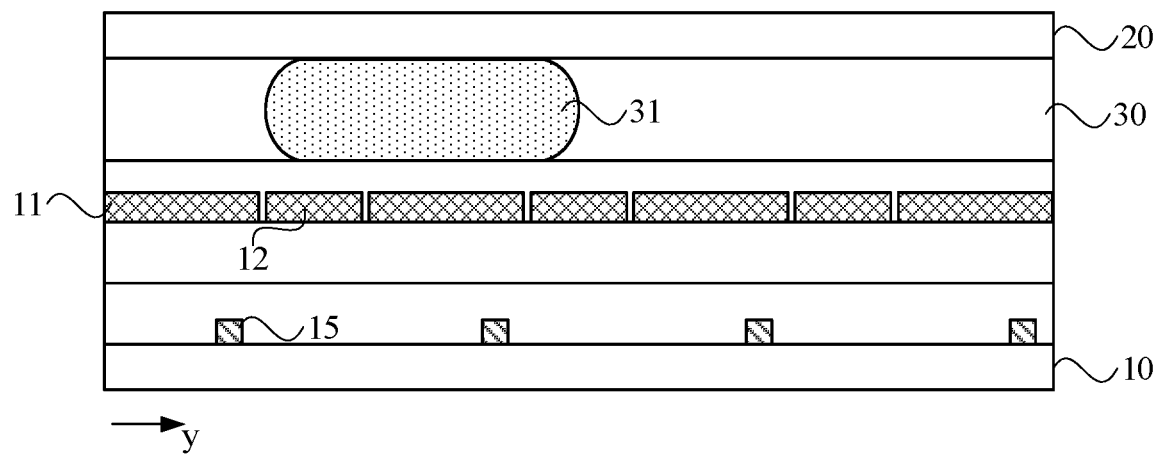
FIG. 9 is a sectional diagram of another microfluidic chip according to an embodiment of the present application.
Figure 10:
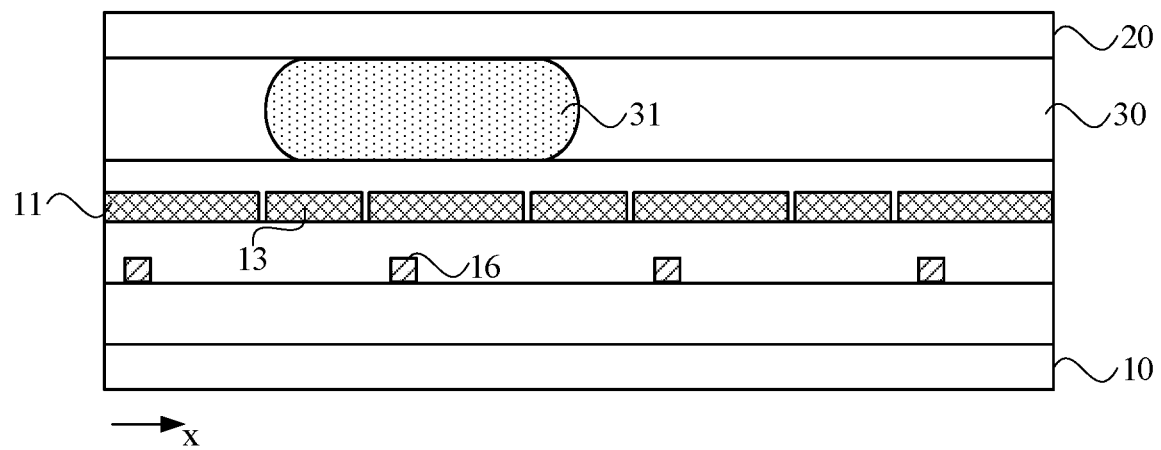
FIG. 10 is a sectional diagram of another microfluidic chip according to an embodiment of the present application.

In one embodiment, the first sensing electrodes or the second sensing electrodes are disposed in a same layer as the drive electrodes. Exemplarily, FIG. 9 is a sectional diagram of another microfluidic chip according to an embodiment of the present application, and a section line is parallel to a column direction of the drive electrode array. Referring to FIG. 9, the first sensing electrodes 12 and the drive electrodes 11 are disposed in a same layer, that is, the first sensing electrode is disposed in the slit between two adjacent rows of drive electrodes 11. FIG. 10 is a sectional diagram of another microfluidic chip according to an embodiment of the present application, and a section is parallel to a column direction of the drive electrode array. Referring to FIG. 10, the second sensing electrodes 13 and the drive electrodes 11 are disposed in a same layer, that is, the second sensing electrode 13 is disposed in the slit between two adjacent columns of drive electrodes 11. During specific implementation, the sensing electrodes disposed in a same layer as the drive electrodes are formed by a same material as the drive electrodes. That is, in the embodiment shown in FIG. 9, the first sensing electrodes 12 and the drive electrodes 11 are made of a same material; and in the embodiment shown in FIG. 10, the second sensing electrodes 13 and the drive electrodes 11 are made of a same material. For example, the material of the drive electrodes 11 may be ITO, which may be selected according to actual conditions during specific implementation. In other embodiments, the first sensing electrodes and the second sensing electrodes may be disposed in a same layer as the drive electrodes, and a bridge is disposed at an intersection of the first sensing electrode and the second sensing electrode, to avoid a short circuit between the first sensing electrode and the second sensing electrode, where the bridge is similar to the structure of a touch electrode in the display panel.

In another embodiment, for example, in the case where the number of drive electrodes of the microfluidic chip is relatively small and the structure is relatively simple, a passive driving method may be adopted, that is, no transistors are provided. In one embodiment, the microfluidic chip provided in this embodiment further includes multiple data signal lines extending along the first direction or the second direction, where each data signal line is connected to a respective drive electrode.

Figure 11:
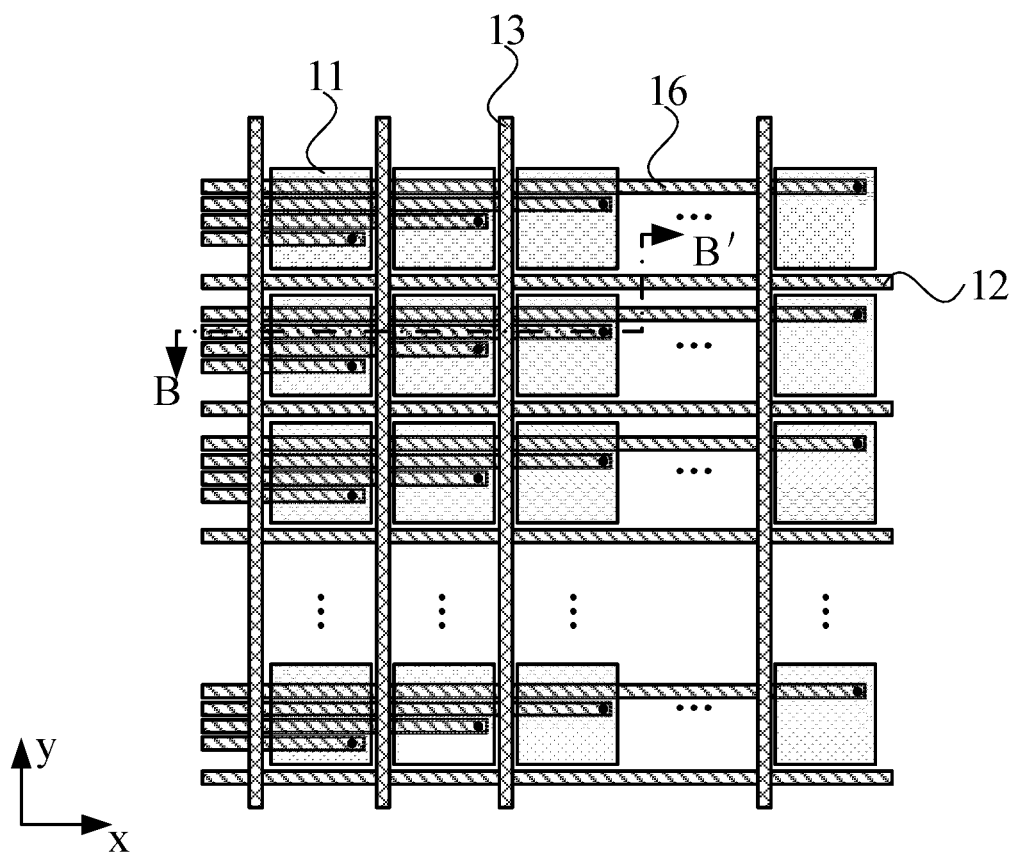
FIG. 11 is a structural diagram of another microfluidic chip according to an embodiment of the present application.

Exemplarily, the case where the data signal lines extend along the first direction is used as an example. FIG. 11 is a structural diagram of another microfluidic chip according to an embodiment of the present application. Referring to FIG. 11, the microfluidic chip further includes multiple data signal lines 16 extending along the first direction x, where the multiple data signal lines 16 are connected to the multiple drive electrodes 11 in a one-to-one correspondence, that is, each data signal line 16 is connected to a respective drive electrode 11. During specific implementation, a via hole may be disposed in a film layer between the data signal line 16 and the drive electrode 11, to achieve electrical connection. In other embodiments, the data signal lines may also extend along the second direction and the structure is similar to the structure in FIG. 11, except that the data signal lines extend along the column direction of the drive electrode array in the case where the data signal lines extend along the second direction.

Figure 12:
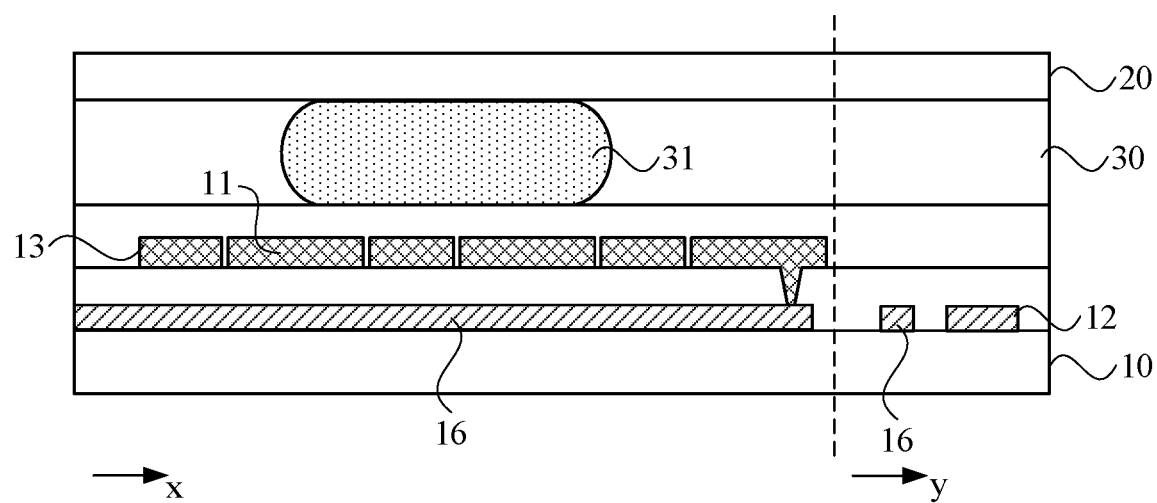
FIG. 12 is a sectional diagram taken along line BB' of FIG. 11.

FIG. 12 is a sectional diagram taken along line BB' of FIG. 11. Referring to FIG. 12, the data signal lines 16 are disposed on a side of the drive electrodes 11 farther away from the second substrate 20; and the data signal lines 16 are insulated from and overlap with drive electrodes 11'.

It is to be understood that the data signal line 16 is electrically connected to a corresponding drive electrode 11, and other drive electrodes 11' disposed in a same row as the drive electrode 11 are insulated from and overlap with the data signal line 16 and the data signal line 16 may be prevented form occupying the slit between the drive electrodes 11, to reduce the effect of the parasitic capacitance generated by the data signal line 16 on signals of the first sensing electrodes 12 or the second sensing electrodes 13.

Referring to FIGS. 11 and 12, the data signal lines 16 extend along the first direction x, the first sensing electrodes 12 and the data signal lines 16 are disposed in a same layer, and the second sensing electrodes 13 and the drive electrodes 11 are disposed in a same layer. In one embodiment, the sensing electrodes disposed in the same layer as the drive electrodes are made of the same material as the drive electrodes. During specific implementation, the first sensing electrodes 12 and the data signal lines 16 may be formed at one time by the same process and material, and the second sensing electrodes 13 and the drive electrodes 11 may be formed at one time using the same process and material. Alternatively, in another embodiment, the data signal lines extend along the second direction, the second sensing electrodes and the data signal lines are disposed in a same layer, the first sensing electrodes and the drive electrodes are disposed in a same layer, the second sensing electrodes and the data signal lines are formed at one time by the same process and material, and the implementation manner is similar to that in FIGS. 11 and 12 and is not described in detail here.

In one embodiment, the microfluidic chip satisfies at least one of the following: each first sensing electrode in the multiple first sensing electrodes extends in a curved shape along the first direction; and each second sensing electrode in the multiple second sensing electrodes extends in a curved shape along the second direction.

Figure 13:
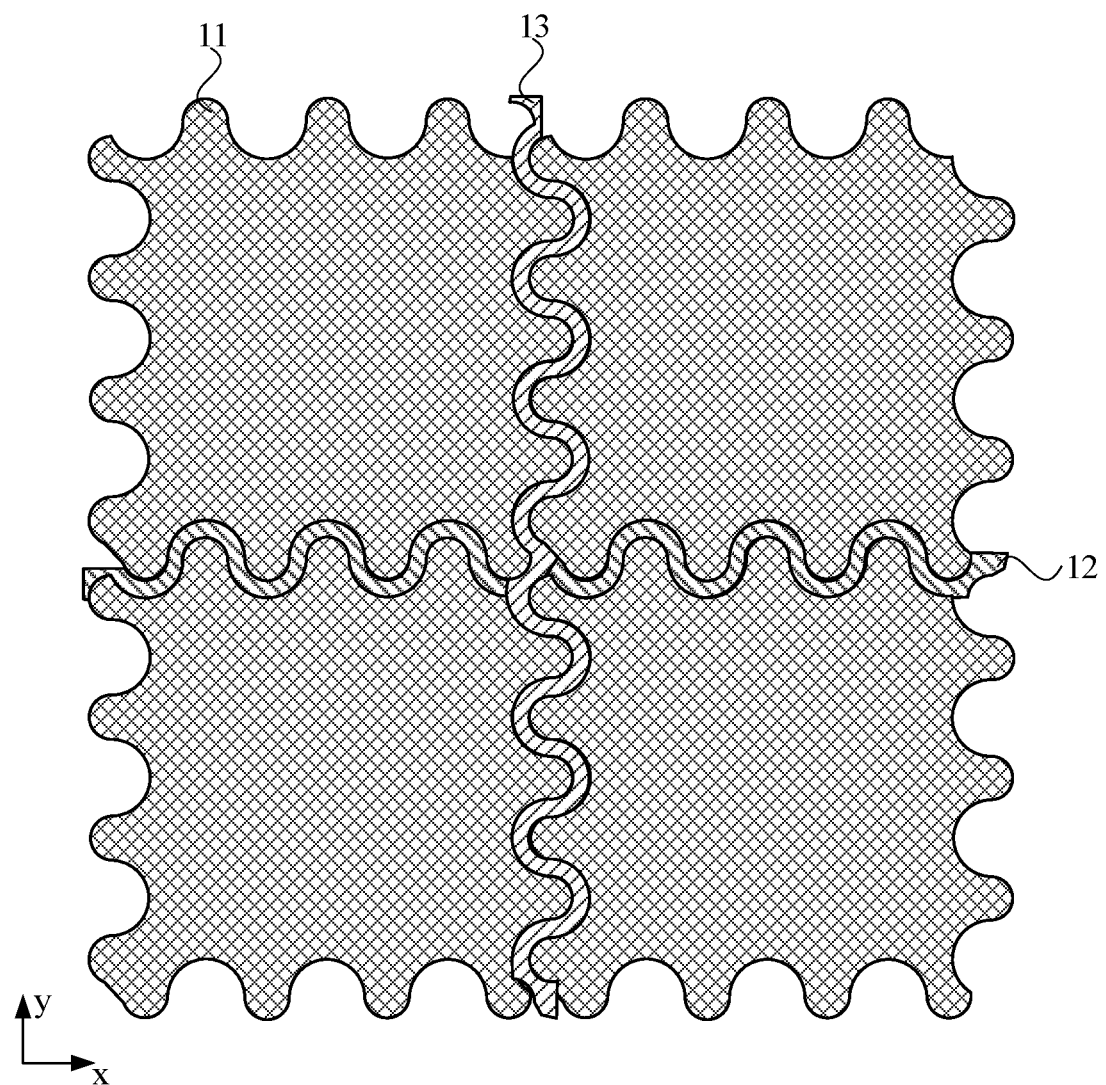
FIG. 13 is a partial structural diagram of a microfluidic chip according to an embodiment of the present application.

Exemplarily, FIG. 13 is a partial structural diagram of a microfluidic chip according to an embodiment of the present application. Referring to FIG. 13, in this embodiment, the first sensing electrode 12 extends in a curved shape along the first direction x, and the second sensing electrode 12 extends in a curved shape along the second direction y, which is conducive to increasing an area of a sensing capacitor formed by the first sensing electrode 12 and the second sensing electrode 13, to increase the signal strength. Correspondingly, an edge of the drive electrode 11 needs to match the shape of the sensing electrode. It is to be understood that, in the embodiment of FIG. 13, the width of the first sensing electrode 12 and the width of the second sensing electrode 13 are the same as the width of the slit of the drive electrodes 11, so boundaries overlap. In other embodiments, the width of the first sensing electrode 12 and the width of the second sensing electrode 13 may be less than the width of the slit of the drive electrodes 11 or may be greater than the width of the slit of the drive electrodes 11. During specific implementation, at least part of the first sensing electrode 12 and at least part of the second sensing electrode 13 need to be disposed in the slit between the drive electrodes 11, to ensure the signal strength during detection of the position of the droplet.

In one embodiment, the curved shape includes a sawtooth shape or a wave shape.

Figure 14:
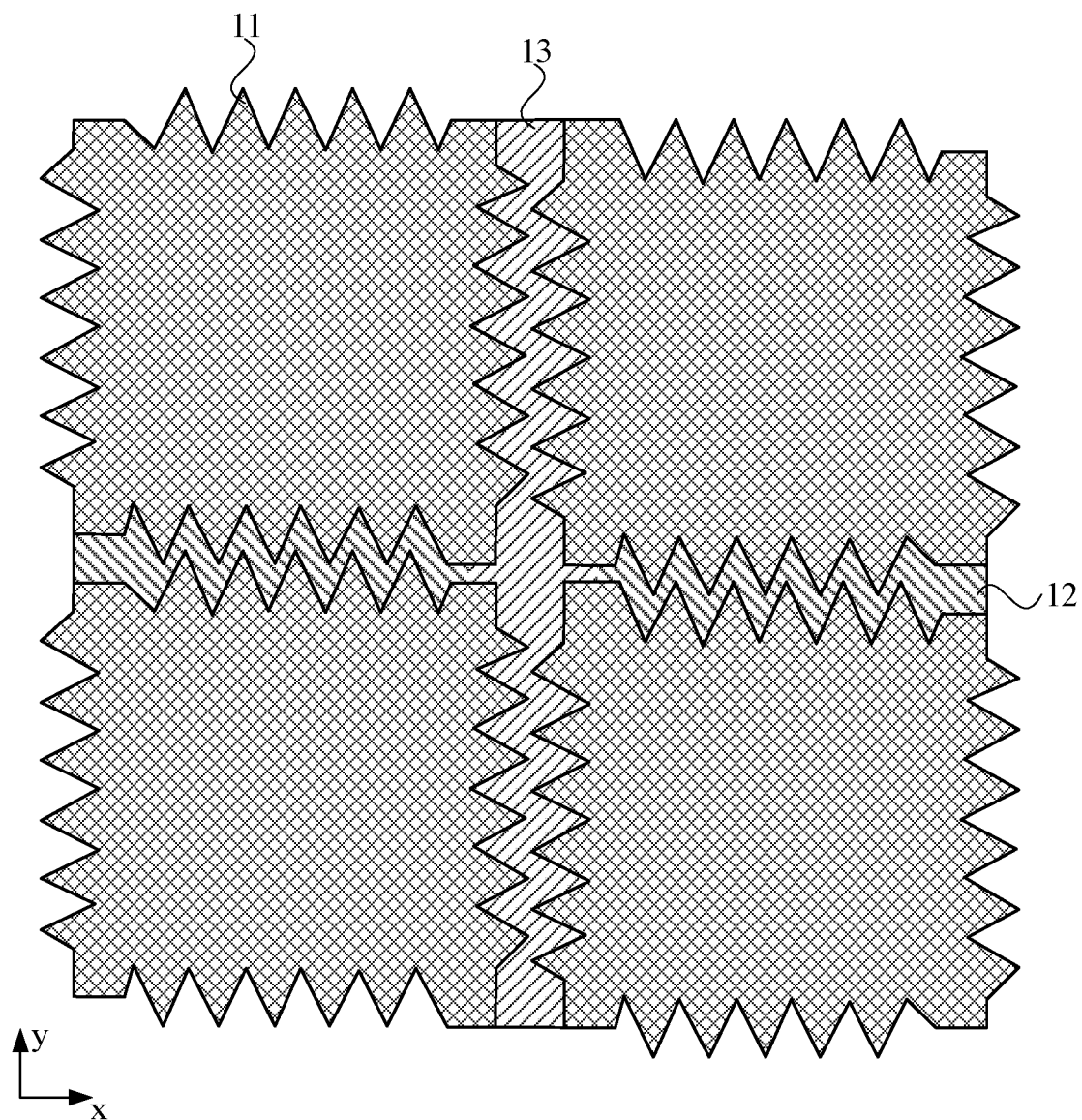
FIG. 14 is a partial structural diagram of another microfluidic chip according to an embodiment of the present application.

Referring to FIG. 13, both the first sensing electrode 12 and the second sensing electrode 13 extend in a wave shape. In other embodiments, the shape of the sensing electrode may also be in a sawtooth shape. For example, FIG. 14 is a partial structural diagram of another microfluidic chip according to an embodiment of the present application. Referring to FIG. 14, both the first sensing electrode 12 and the second sensing electrode 13 extend in a sawtooth shape. In other embodiments, the first sensing electrode 12 and the second sensing electrode 13 may also be designed in other curved shape, which is not limited in the embodiments of the present application.

It is to be noted that the curved shapes of the first sensing electrode 12 and the second sensing electrode 13 shown in FIGS. 13 and 14 are only exemplary. In other embodiments, only the first sensing electrode or the second sensing electrode may be curved. A corresponding edge shape of the drive electrode corresponds to the edge of the sensing electrode, which may be designed according to actual conditions during specific implementation.

In one embodiment, referring to FIG. 13 or 14, the edge shape of the drive electrode 11 is the same as the edge shape of a side of the first sensing electrode 12 or the second sensing electrode 13 adjacent to the drive electrode closer to the drive electrode, that is, the edge shape of the drive electrode 11 is engaged with the adjacent first sensing electrode 12 or the adjacent second sensing electrode 13. A projection of the first sensing electrode 12 on the plane where the first substrate is located is located between projections of two rows of drive electrodes 11 adjacent to the first sensing electrode 12 on the plane where the first substrate is located, that is, the first sensing electrode 12 is located in the slit between two adjacent rows of drive electrodes 11, and the first sensing electrode 12 and the two adjacent rows of drive electrodes 11 may be in the same layer or different layers. A projection of the second sensing electrode 13 on the plane where the first substrate is located is located between projections of two columns of drive electrodes 11 adjacent to the second sensing electrode 13 on the plane where the first substrate is located, that is, the second sensing electrode 13 is located in the slit between two adjacent columns of drive electrodes 11, and the second sensing electrode 13 and the two adjacent columns of drive electrodes 11 may be in the same layer or different layers. FIGS. 13 and 14 are top diagrams of the microfluidic chip and do not show the structure of the first substrate.

Since an electric field needs to be formed between adjacent drive electrodes 11 in this embodiment, to drive the droplet to move, the edge of the drive electrode 11 is also designed in a curved shape, to increase an overlapping length between the adjacent drive electrodes 11 and effectively increase a facing area between the adjacent drive electrodes 11, to increase the electric field strength between the two drive electrodes 11, which is more conducive to driving the droplet to move.

Figure 15:
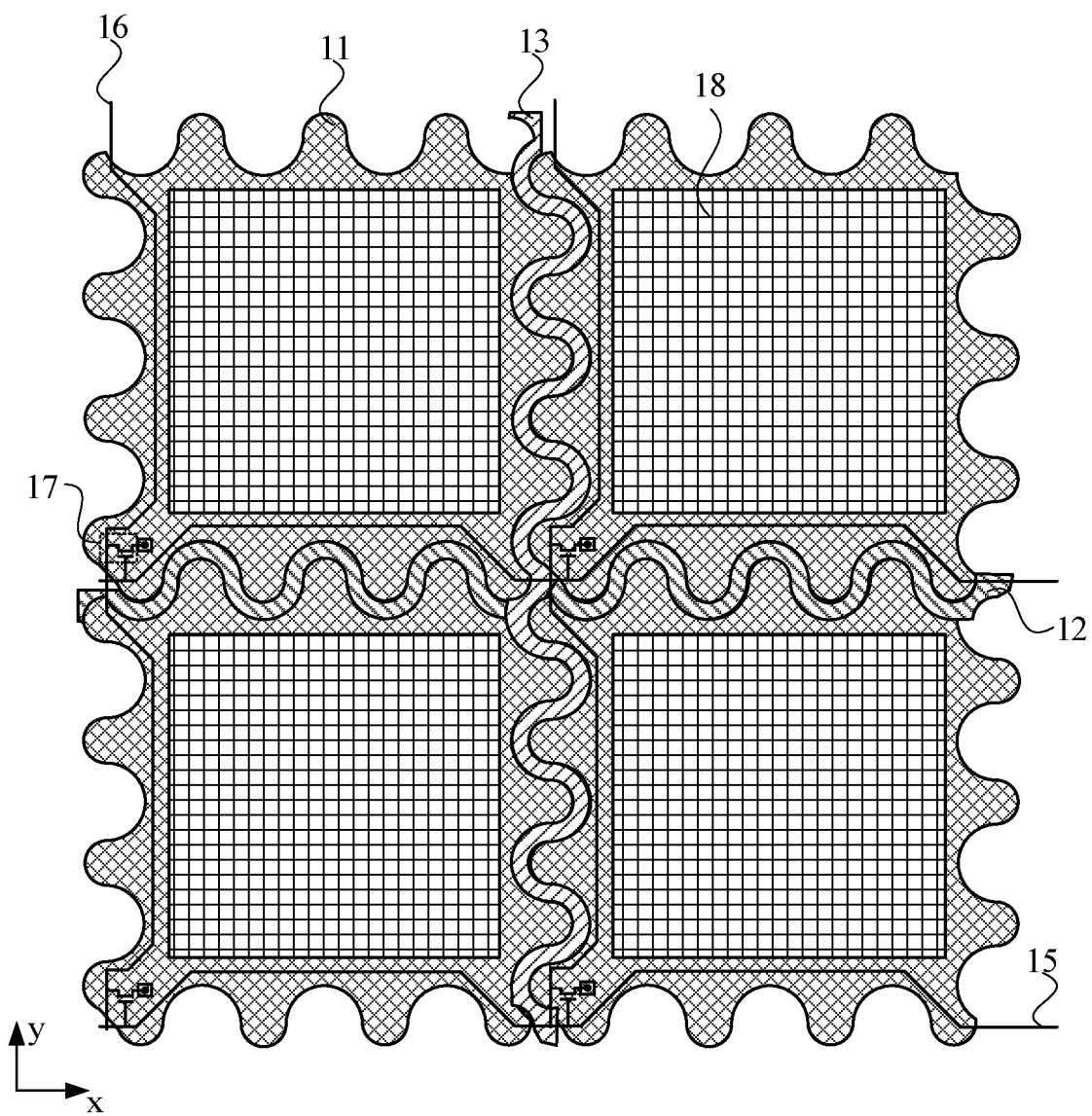
FIG. 15 is a partial structural diagram of another microfluidic chip according to an embodiment of the present application.

FIG. 15 is a partial structural diagram of another microfluidic chip according to an embodiment of the present application. In one embodiment, referring to FIG. 15, the microfluidic chip provided in this embodiment further includes multiple scan signal lines 15, multiple data signal lines 16, multiple first electrodes 18 in a one-to-one correspondence with multiple drive electrodes 11, and multiple transistors 17 in a one-to-one correspondence with the multiple drive electrodes 11 (FIG. 15 shows a circuit schematic diagram of the transistor 17 and does not show the structure of the transistor 17), where a gate of each transistor 17 is connected to one scan signal line 15, a first pole of each transistor 17 is connected to one data signal line 16, a second pole of each transistor 17 is connected to a respective drive electrode 11 through a via hole, and each first electrode 18 in multiple first electrodes and a drive electrode 11 corresponding to the each first electrode form a storage capacitor; and the scan signal line 15, the data signal line 16, the first electrode 18, and the transistor 17 are located in the projection of the drive electrode 11 on the plane where the first substrate is located, and edges of the scan signal line 15, the data signal line 16, and the drive electrode 11 bypass the edge of the transistor 17.

It is to be understood that when a drive voltage is applied to the drive electrode 11, the drive voltage needs to be maintained for a period of time. To maintain the voltage stability of the drive electrode 11, the first electrode 18 and the drive electrode 11 may form a storage capacitor. Since the first sensing electrode 12 and the second sensing electrode 13 are located in the slit of the drive electrodes 11, the scan signal line 15, the data signal line 16, the first electrode 18, and the transistor 17 are all located below the drive electrode 11, and the region of the scan signal line 15 and the data signal line 16 closer to the transistor 17 and edges of the first sensing electrode 12 and the second sensing electrode 13 bypass a region where the transistor 17 is located, to leave enough space for the transistor 17. The wiring manner may be designed according to actual conditions.

In the structure shown in FIG. 15, each first electrode 18 is a separate electrode. Since the function of the first electrode 18 is to form a storage capacitor with the drive electrode 11, in other embodiments, multiple first electrodes 18 may be electrically connected and the same voltage signal is applied on the multiple first electrodes 18. In one embodiment, at least two adjacent first electrodes are electrically connected, and a connecting portion of the two first electrodes electrically connected to each other include a hollow region, and the hollow region overlaps with the first sensing electrode and/or the second sensing electrode.

Figure 16:
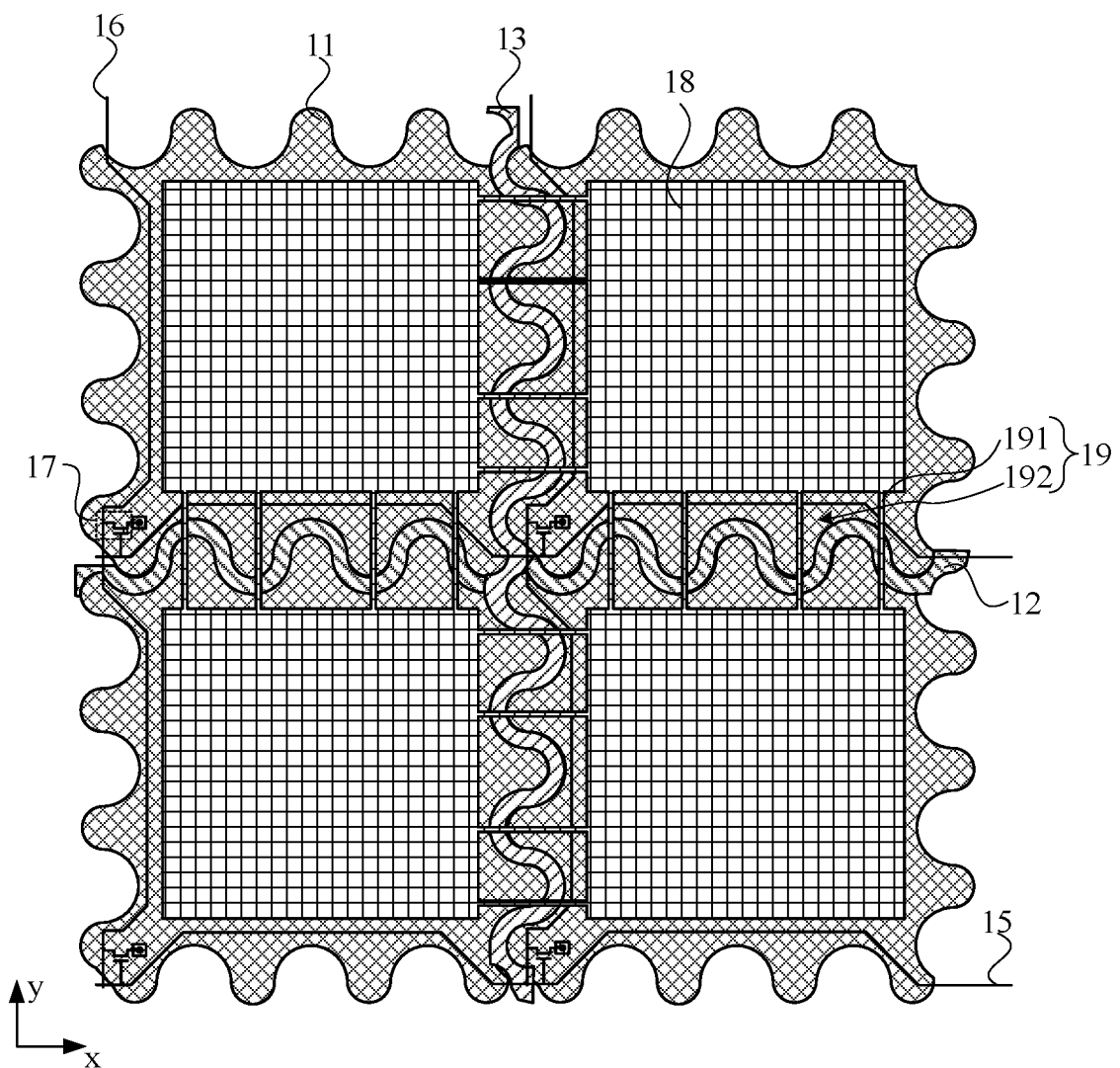
FIG. 16 is a partial structural diagram of another microfluidic chip according to an embodiment of the present application.

Exemplarily, FIG. 16 is a partial structural diagram of another microfluidic chip according to an embodiment of the present application. Referring to FIG. 16, both two adjacent first electrodes 18 are electrically connected through a connecting trace 191 of a connecting portion 19 between electrodes, the connecting portion 19 includes a hollow region 192, and the hollow region 192 overlaps with the first sensing electrode 12 or the second sensing electrode 13.

It is to be understood that at least two first electrodes 18 are electrically connected, and signals may be applied to multiple first electrodes 18 at the same time, to reduce the wiring difficulty and driving cost; and the hollow region 192 is provided in the connecting portion 19, to reduce the signal interference of the connecting portion 19 to the sensing electrode and improving the detection accuracy. It is to be noted that the arrangement of four connecting traces 191 and three hollow regions 192 between two first electrodes 18 shown in FIG. 16 is only schematic, and the number of the connecting traces and the number of the hollow regions are not limited during specific implementation.

Figure 17:
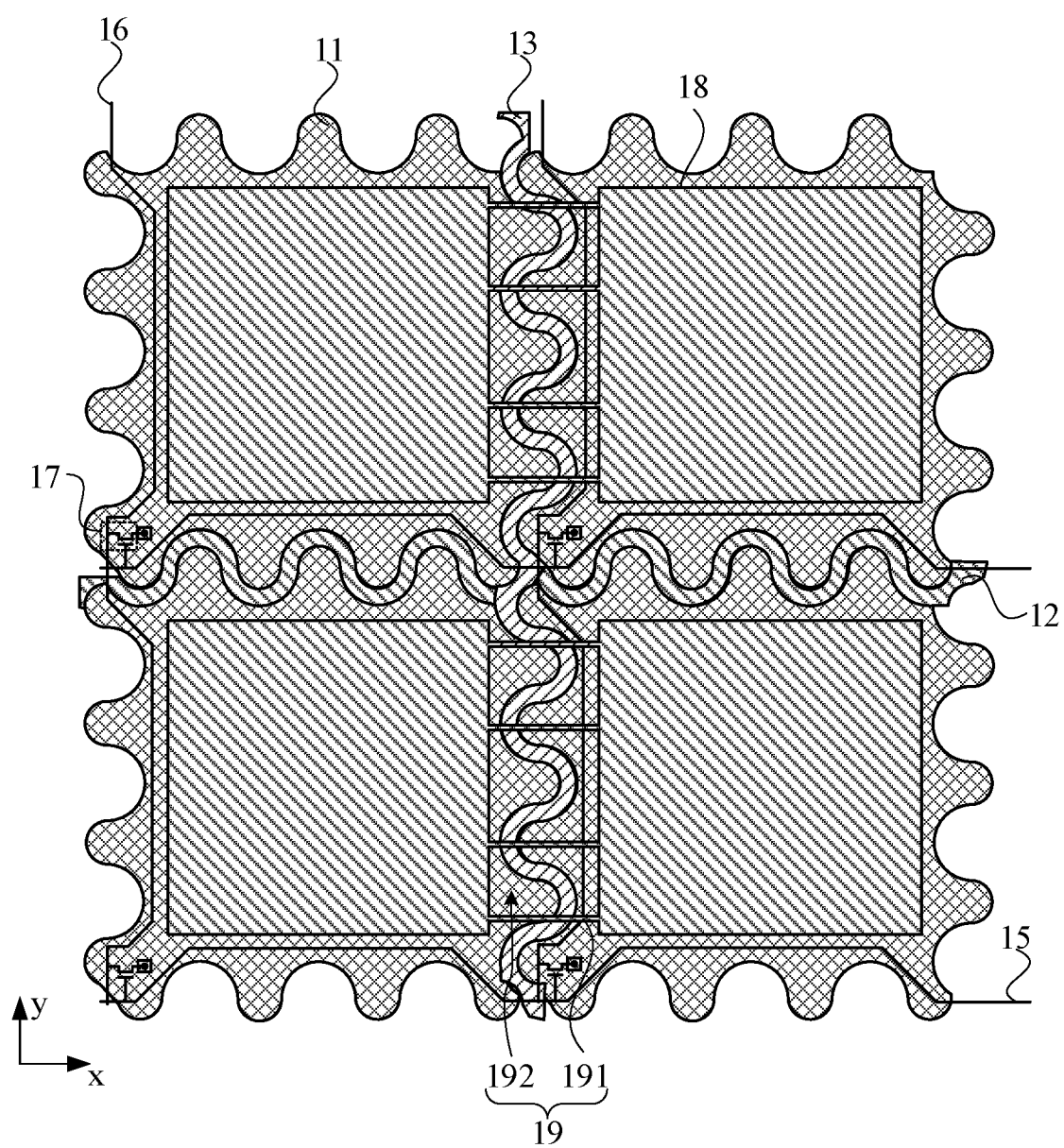
FIG. 17 is a partial structural diagram of another microfluidic chip according to an embodiment of the present application.
Figure 18:
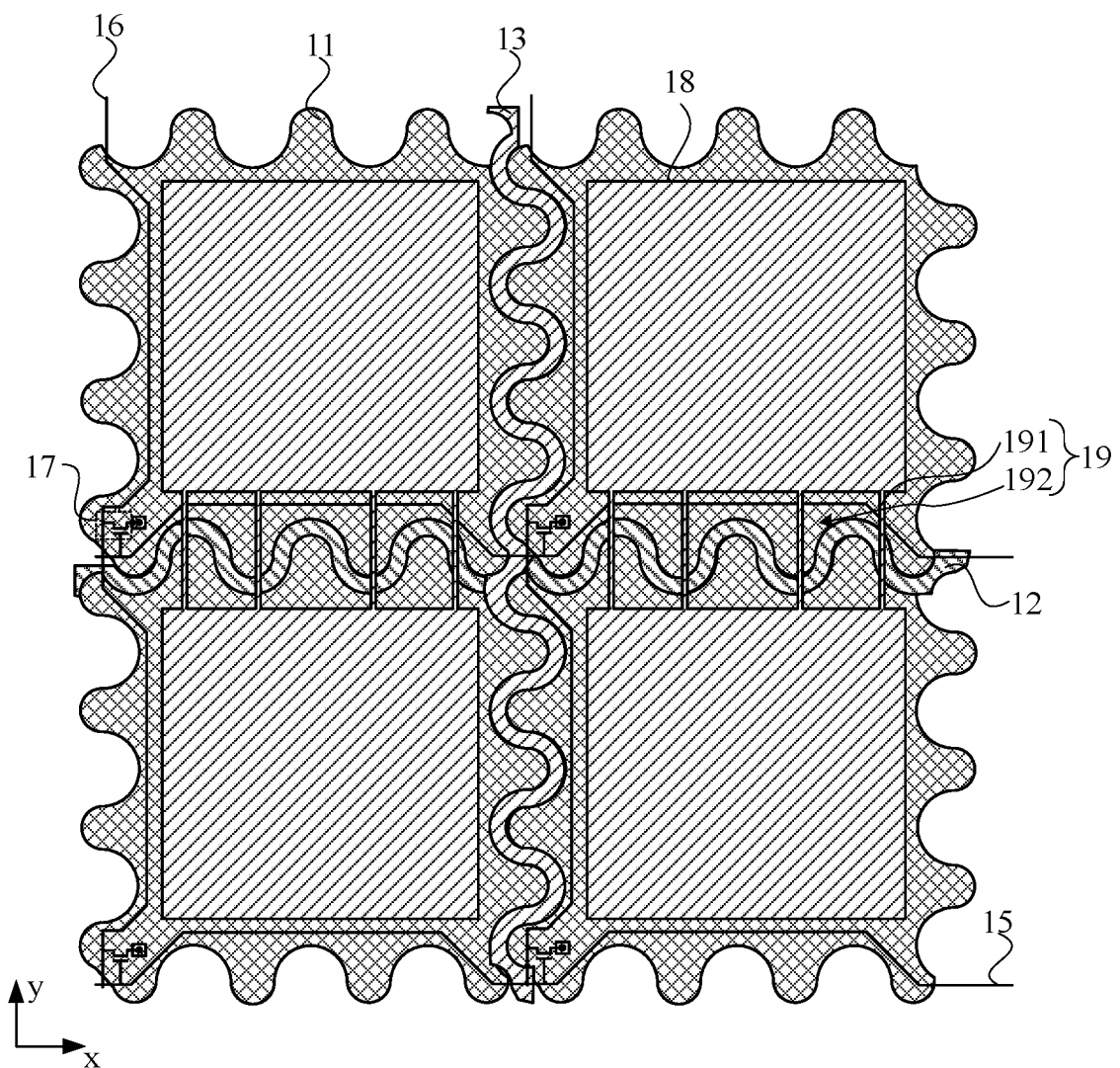
FIG. 18 is a partial structural diagram of another microfluidic chip according to an embodiment of the present application.

In the embodiment shown in FIG. 16, the first electrode 18 is not disposed in the same layer as the first sensing electrode 12 and the second sensing electrode 13. For example, in the structure shown in FIG. 6, in other embodiments, to reducing the number of film layers, the first sensing electrode and the scan signal line are disposed in the same layer, and the second sensing electrode and the data signal line are disposed in the same layer. Exemplarily, FIG. 17 is a partial structural diagram of another microfluidic chip according to an embodiment of the present application. Referring to FIG. 17, the first electrode 18 and the first sensing electrode 12 are disposed in the same layer, and the connecting trace 191 of the connecting portion 19 of two first electrodes 18 electrically connected to each other extends along the first direction x. FIG. 18 is a partial structural diagram of another microfluidic chip according to an embodiment of the present application. Referring to FIG. 18, the first electrode 18 and the second sensing electrode 13 are disposed in the same layer, and the connecting trace 191 of the connecting portion 19 of two first electrodes 18 electrically connected to each other extends along the second direction y. FIGS. 17 and 18 both show the top diagram of the microfluidic chip, and the same filling indicates the same layer arrangement. For example, the first electrode 18 and the first sensing electrode 12 in FIG. 17 are filled with the same shape.

In one embodiment, each first sensing electrode or each second sensing electrode include a first region and a second region, and the first region of each first sensing electrode is insulated from and overlaps with the first region of the second sensing electrode corresponding to the each first sensing electrode. The first sensing electrode and the second sensing electrode satisfy at least one of the following: a width of the first region of the first sensing electrode is less than a width of the second region of the first sensing electrode; or a width of the first region of the second sensing electrode is less than a width of the second region of the second sensing electrode.

Figure 19:
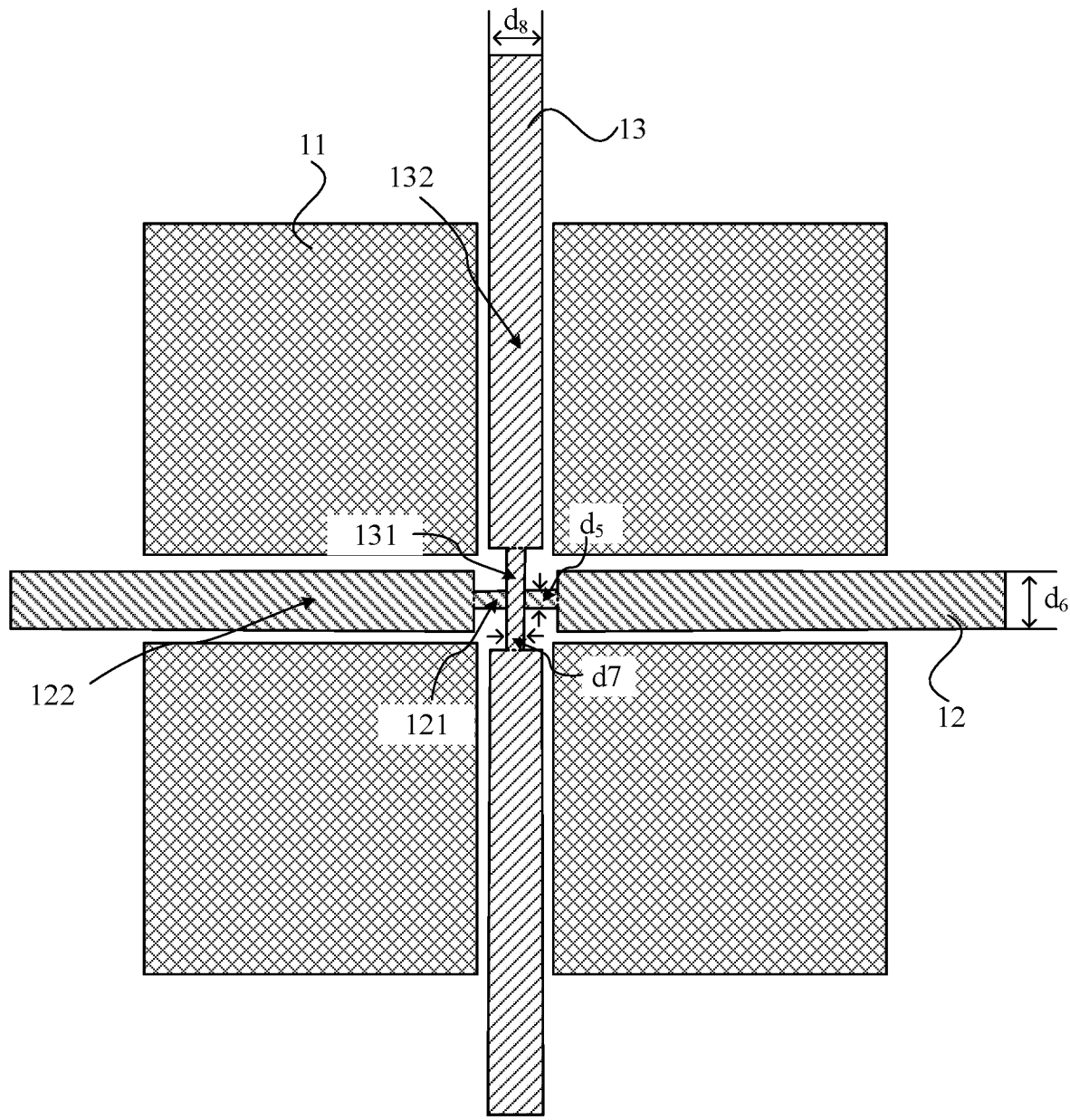
FIG. 19 is a partial structural diagram of another microfluidic chip according to an embodiment of the present application.

Exemplarily, FIG. 19 is a partial structural diagram of another microfluidic chip according to an embodiment of the present application. Referring to FIG. 19, the first sensing electrode 12 includes a first region 121 and a second region 122, the second sensing electrode 13 includes a first region 131 and a second region 132, and the first region 121 of the first sensing electrode 12 intersects with the first region 131 of the second sensing electrode 13. It is to be noted that the intersection here refers to that a vertical projection of the first region 121 of the first sensing electrode 12 on the plane where the first substrate is located intersects with a vertical projection of the first region 131 of the second sensing electrode 13 on the plane where the first substrate is located. A width $d_5$ of the first region 121 of the first sensing electrode 12 is less than a width $d_6$ of the second region 122, and a width $d_7$ of the first region 131 of the second sensing electrode 13 is less than a width $d_8$ of the second region 132, to reduce an overlapping area of the two sensing electrodes and reducing the parasitic capacitance.

In the case where the first sensing electrode 12 and the second sensing electrode 13 extend in a curved shape, a width of an intersection region may also be designed to be narrowed, which may be designed according to actual conditions during specific implementation.

In other embodiments, a narrow line width may be designed only at the intersection of the first sensing electrode or the second sensing electrode, to reduce the parasitic capacitance. In some embodiments, for example, in a microfluidic chip with a relatively small number of drive electrodes, a simple structure, and only one droplet, to simplify the circuit structure, detection signals may be applied to all the first sensing electrodes and the second sensing electrodes at the same time, to determine the position of the droplet according to the change in capacitance. However, in the case where at least two droplets exist, to avoid ghost points, signals may be applied to the sensing electrodes in one direction by using a scanning method. In one embodiment, detection signals are sequentially applied to the first sensing electrodes along the second direction at different times or detection signals are sequentially applied to the second sensing electrode along the first direction at different times, to determine the position of the droplet according to a change in capacitance between the first sensing electrode and an electrode corresponding to the first sensing electrode and a change in capacitance between the second sensing electrode and an electrode corresponding to the second sensing electrode when the droplet flows by.

Since the first sensing electrode intersects with the second sensing electrode and an intersection point may form a capacitor, the position of the droplet may be determined by using the change in capacitance between the first sensing electrode and the second sensing electrode. In an embodiment, one of the first sensing electrode or the second sensing electrode is a transmission electrode, and the other is a receiving electrode; and the position of the droplet is determined according to a change in capacitance between the first sensing electrode and the second sensing electrode when the droplet flows by.

In another embodiment, the position of the droplet may be determined according to a change in capacitance between the sensing electrode and the common electrode located on the second substrate. In one embodiment, the common electrode includes multiple branch electrodes extending along the first direction or the second direction, and the number of the branch electrodes is the same as the number of multiple first sensing electrodes or the number of multiple second sensing electrodes.

Figure 20:
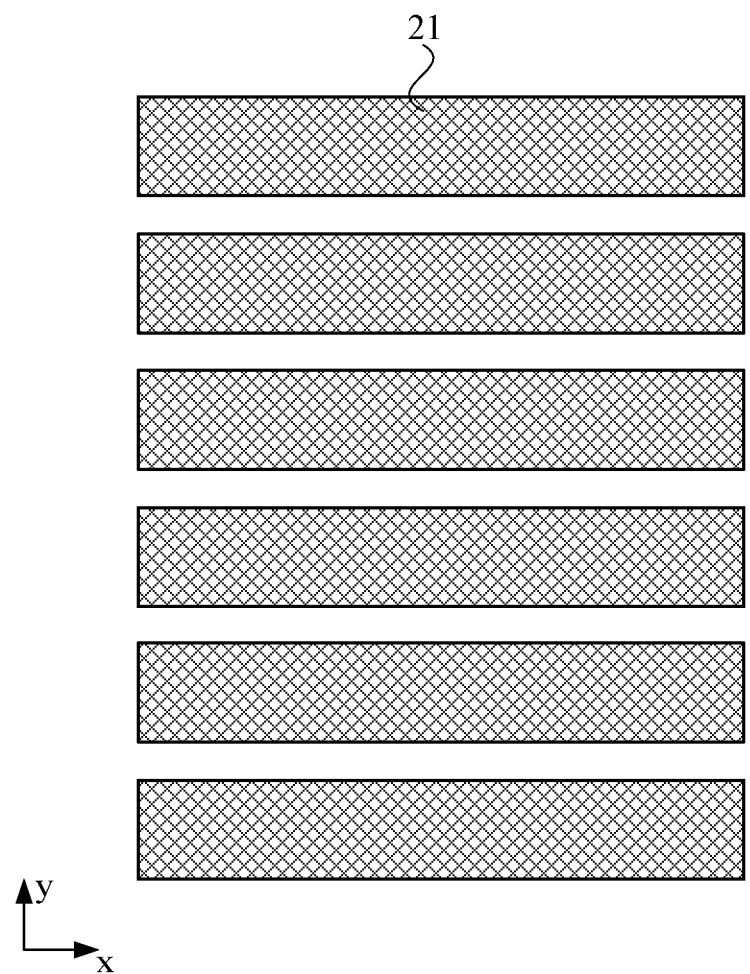
FIG. 20 is a top diagram of a common electrode in a microfluidic chip according to an embodiment of the present application.
Figure 21:
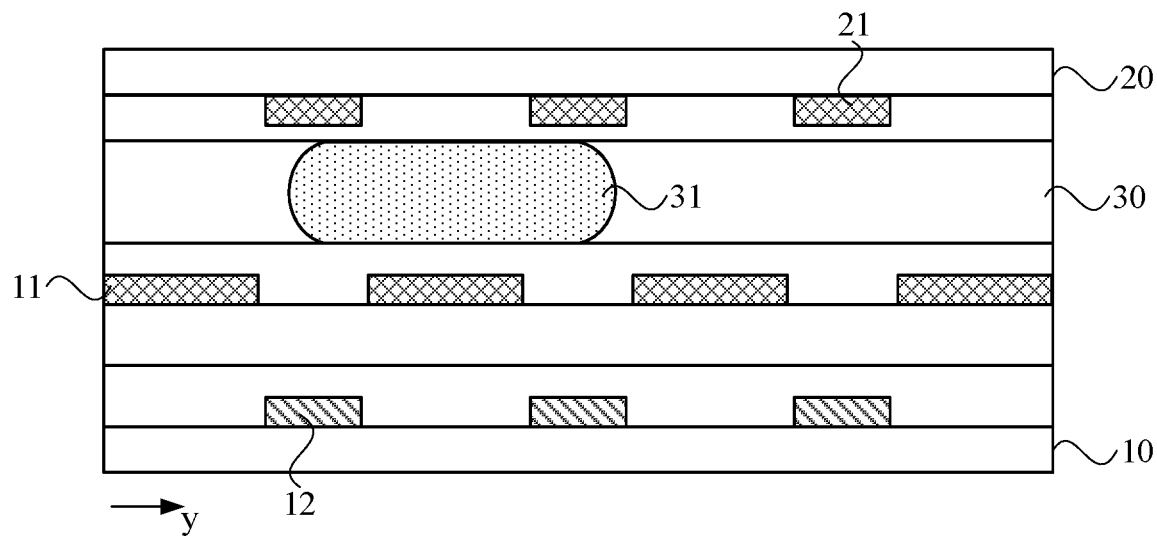
FIG. 21 is a sectional diagram of another microfluidic chip according to an embodiment of the present application.

Exemplarily, FIG. 20 is a top diagram of a common electrode in a microfluidic chip according to an embodiment of the present application, and FIG. 21 is a sectional diagram of another microfluidic chip according to an embodiment of the present application. In FIGS. 20 and 21, the case where the common electrode 21 includes multiple branch electrodes extending along the first direction is used as an example, and FIG. 21 shows a sectional diagram taken along a section line parallel to the second direction. In this embodiment, the branch electrode may be driven independently and form a capacitor with the first sensing electrode 12 or the second sensing electrode 13, to position the droplet.

In the microfluidic chip, the dimension of the drive electrode is generally in the order of millimeters, and the distance between the drive electrodes may be several tens of micrometers. In one embodiment, along the first direction, the distance between two adjacent drive electrodes is 10 μm to 40 μm; and along the second direction, the distance between two adjacent drive electrodes is 10 μm to 40 μm, to ensure a relatively large area of the first sensing electrode and the second sensing electrode and the signal strength during detection of the droplet position. In other embodiments, an insulating hydrophobic layer is disposed on a side of each of the first substrate and the second substrate facing toward the microfluidic channel, to achieve insulation and reduce the movement resistance of the droplet.

An embodiment of the present application further provides a microfluidic chip. The microfluidic chip includes a first substrate and a second substrate disposed opposite to each other and multiple drive electrodes disposed on a side of the first substrate. A microfluidic channel is formed between the first substrate and the second substrate and configured to accommodate at least one droplet. The multiple drive electrodes are arranged in an array, and different drive voltage signals are applied to adjacent drive electrodes, to drive the droplet to move. At least one edge of each of the multiple drive electrodes extends in a curved shape.

Figure 22:
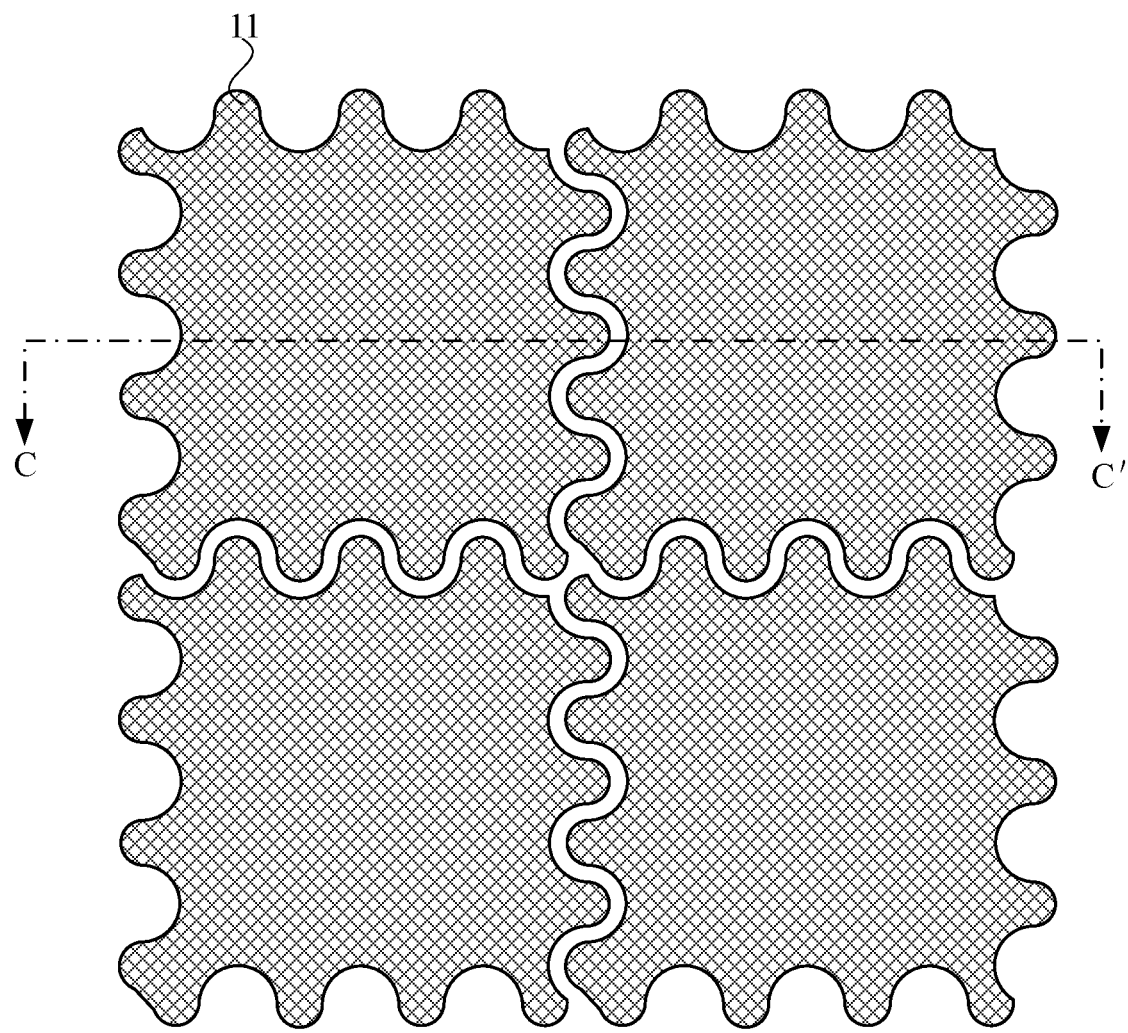
FIG. 22 is a partial structural diagram of another microfluidic chip according to an embodiment of the present application.
Figure 23:
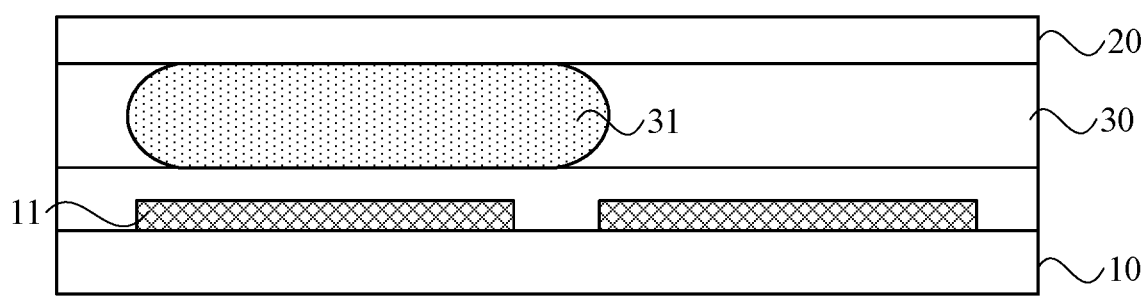
FIG. 23 is a sectional diagram taken along line CC' of FIG. 22.

Exemplarily, FIG. 22 is a partial structural diagram of another microfluidic chip according to an embodiment of the present application, and FIG. 23 is a sectional diagram taken along line CC' of FIG. 22. Referring to FIG. 22, the microfluidic chip includes multiple drive electrodes 11 arranged in an array, different drive voltages are applied to adjacent drive electrodes 11, the droplet is driven by a differential voltage between the adjacent drive electrodes 11 and controlled to move according to a preset path, and an edge of the drive electrode 11 extends in a curved shape. The wave shape shown in FIG. 22 is only schematic, and the edge of the drive electrode 11 may be a sawtooth shape or other curved shapes during specific implementation. Referring to FIG. 23, the microfluidic chip includes a first substrate 10 and a second substrate disposed opposite to each other, where a microfluidic channel 30 is formed between the first substrate 10 and the second substrate 20 and configured to accommodate at least one droplet 31. In other embodiments, a common electrode may also be provided on the second substrate 20, structures such as scan signal lines, data signal lines, and transistors may also be provided, and the first sensing electrode and the second sensing electrode may be disposed in the slit of the drive electrodes, to acquire the position of the droplet, which may be designed according to actual requirements during specific implementation.

An embodiment of the present application further provides a microfluidic chip. The microfluidic chip includes a first substrate and a second substrate disposed opposite to each other and multiple drive electrodes disposed on a side of the first substrate. A microfluidic channel is formed between the first substrate and the second substrate and configured to accommodate at least one droplet. The multiple drive electrodes are arranged in an array, and different drive voltage signals are applied to adjacent drive electrodes, to drive the droplet to move. Multiple scan signal lines extending along a first direction, multiple data signal lines extending along a second direction, and multiple transistors in a one-to-one correspondence with the multiple drive electrodes are further included, where a gate of each transistor is connected to one scan signal line, a first pole of each transistor is connected to one data signal line, and a second pole of each transistor is connected to a respective drive electrode; the scan signal lines, the data signal lines, and the transistors are all disposed on a side of the drive electrodes farther away from the second substrate; and at least one of the scan signal line, the data signal line, or the transistor overlaps with the drive electrode.

Figure 24:
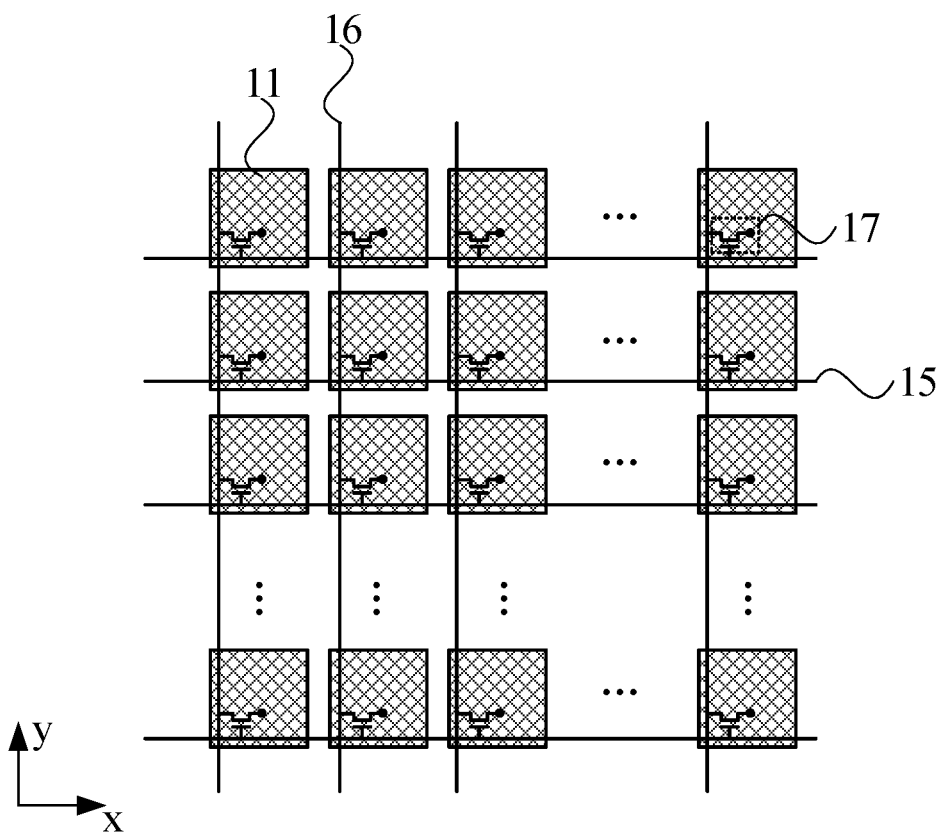
FIG. 24 is a partial structural diagram of another microfluidic chip according to an embodiment of the present application.
Figure 25:
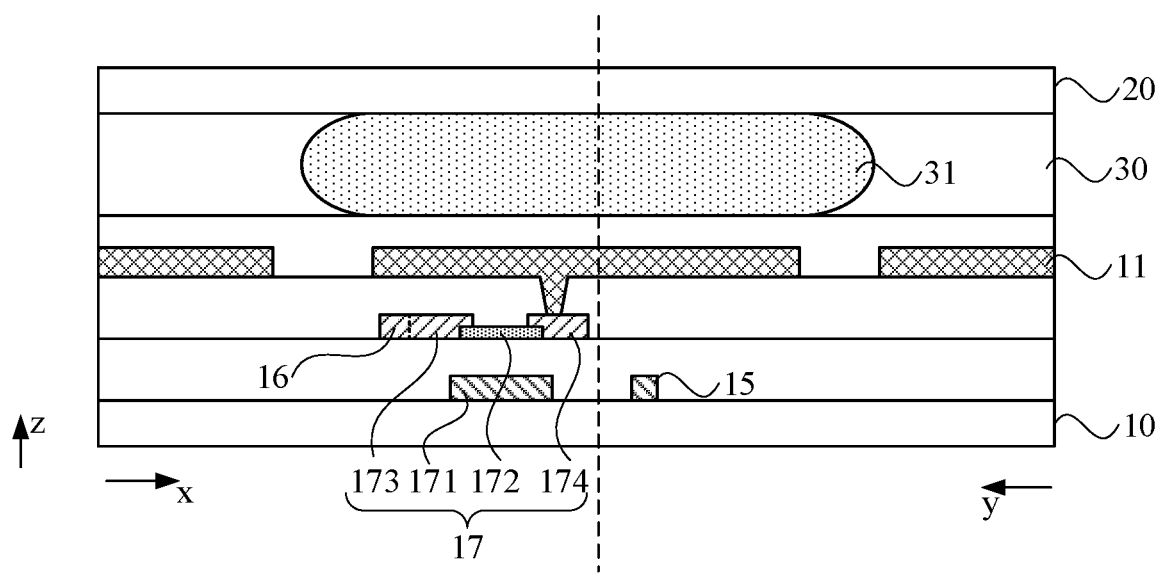
FIG. 25 is a sectional diagram of FIG. 24.

Exemplarily, FIG. 24 is a partial structural diagram of another microfluidic chip according to an embodiment of the present application, and FIG. 25 is a sectional diagram of FIG. 24. Referring to FIG. 24, the microfluidic chip includes multiple drive electrodes 11 arranged in an array, different drive voltages are applied to adjacent drive electrodes 11, and the droplet is driven by a differential voltage between the adjacent drive electrodes 11 and controlled to move according to a preset path. Multiple scan signal lines 15 extending along a first direction x, multiple data signal lines 16 extending along a second direction y, and multiple transistors 17 in a one-to-one correspondence with the multiple drive electrodes 11 are further included, where a gate of each transistor 17 is connected to one scan signal line 15, a first pole of each transistor 17 is connected to one data signal line 16, and a second pole of each transistor 17 is connected to a respective drive electrode 11. Referring to FIG. 25, the transistor 17 includes a gate 171, an active layer 172, a source 173 (a first pole), and a drain 174 (a second pole), and the scan signal line 15, the data signal line 16, and the transistor 17 are disposed on a side of the drive electrode 1 farther away from the second substrate 20; and the scan signal line 15 and/or the data signal line 16 are not routed in the slit between the drive electrodes 11 and are both located below the drive electrodes 11. Correspondingly, the transistor 17 is also disposed below the drive electrode 11 and not in the slit. In this manner, the drive electrode 11 may shield the parasitic capacitance caused by the scan signal line 13, the data signal line 14 or the transistor 15, to improve the driving accuracy and speed of the droplet and avoiding a reaction force to the movement of the droplet formed by an electric field generated between the scan signal line 15/the data signal line 16 and the drive electrode. In other embodiments, at least one of the scan signal line, the data signal line, or the transistor overlaps with the drive electrode, and an edge of the drive electrode 11 extends in a curved shape, which is similar to the wave shape shown in FIG. 22. In other embodiments, the first sensing electrode and the second sensing electrode may also be disposed in the slit of the drive electrodes to acquire the position of the droplet, which is combined with the embodiment with a droplet positioning function. For example, reference may be made to the structure of the microfluidic chip provided in the preceding embodiments.

What is claimed is:

1. A microfluidic chip, comprising:
   a first substrate and a second substrate disposed opposite to each other, wherein a microfluidic channel is formed between the first substrate and the second substrate and configured to accommodate at least one droplet; and
   a plurality of drive electrodes, a plurality of first sensing electrodes and a plurality of second sensing electrodes disposed on a side of the first substrate, wherein the plurality of drive electrodes are arranged in an array, the plurality of first sensing electrodes extend along a first direction and are arranged along a second direction, the plurality of second sensing electrodes extend along the second direction and are arranged along the first direction, the first direction is parallel to a row direction of the array where the plurality of drive electrodes are arranged, the second direction is parallel to a column direction of the array where the plurality of drive electrodes are arranged, a projection of each of the plurality of first sensing electrodes on a plane where the first substrate is located at least partially overlaps with a projection of a slit of two rows of drive electrodes of the plurality of drive electrodes adjacent to the each of the plurality of first sensing electrodes on the plane where the first substrate is located, and a projection of each of the plurality of second sensing electrodes on the plane where the first substrate is located at least partially overlaps with a projection of a slit of two columns of drive electrodes of the plurality of drive electrodes adjacent to the each of the plurality of second sensing electrodes on the plane where the first substrate is located;
   wherein different drive voltage signals are applied to adjacent drive electrodes of the plurality of drive electrodes, to drive the at least one droplet to move; and
   a detection signal is applied to each of the plurality of first sensing electrodes and each of the plurality of second sensing electrodes, and a position of the at least one droplet is determined according to a change in capacitance between a first sensing electrode of the plurality of first sensing electrodes and an electrode corresponding to the first sensing electrode and a change in capacitance between a second sensing electrode of the plurality of second sensing electrodes and an electrode corresponding to the second sensing electrode when the at least one droplet flows by;
   wherein the microfluidic chip further comprises a plurality of scan signal lines extending along the first direction, a plurality of data signal lines extending along the second direction, and a plurality of transistors in correspondence with the plurality of drive electrodes,
   wherein a gate of one of the plurality of transistors is connected to one of the plurality of scan signal lines, a first pole of one of the plurality of transistors is connected to one of the plurality of data signal lines, and a second pole of one of the plurality of transistors is connected to a respective one of the plurality of drive electrodes;
   wherein the plurality of transistors overlap with the plurality of drive electrodes and are disposed below the plurality of drive electrodes; and
   wherein the plurality of scan signal lines overlap with the plurality of drive electrodes and are disposed below the plurality of drive electrodes, and/or the plurality of data signal lines overlap with the plurality of drive electrodes and are disposed below the plurality of drive electrodes.

2. The microfluidic chip of claim 1, wherein the plurality of scan signal lines, the plurality of data signal lines, and the plurality of transistors are all disposed on a side of the plurality of drive electrodes farther away from the second substrate.

3. The microfluidic chip of claim 1, wherein the plurality of first sensing electrodes and the plurality of scan signal lines are disposed in a same layer, and the plurality of second sensing electrodes and the plurality of data signal lines are disposed in a same layer.

4. The microfluidic chip of claim 1, wherein the plurality of first sensing electrodes or the plurality of second sensing electrodes are disposed in a same layer as the plurality of drive electrodes.

5. The microfluidic chip of claim 4, wherein the plurality of first sensing electrodes and the plurality of second sensing electrodes disposed in a same layer as the plurality of drive electrodes and the plurality of drive electrodes are made of a same material.

6. The microfluidic chip of claim 1, wherein the microfluidic chip satisfies at least one of the following: each of the plurality of first sensing electrodes extends in a curved shape along the first direction; or each of the plurality of second sensing electrodes extends in a curved shape along the second direction,
   wherein the curved shape comprises a sawtooth shape or a wave shape.

7. The microfluidic chip of claim 6, wherein an edge of each of the plurality of drive electrodes has a same shape as an edge of a closer side of one of the plurality of first sensing electrodes adjacent to the each of the plurality of drive electrodes or an edge of a closer side of one of the plurality of second sensing electrodes adjacent to the each of the plurality of drive electrodes, the projection of each of the plurality of first sensing electrodes on the plane where the first substrate is located is located between projections of two rows of drive electrodes of the plurality of drive electrodes adjacent to the each of the plurality of first sensing electrodes on the plane where the first substrate is located, and the projection of each of the plurality of second sensing electrodes on the plane where the first substrate is located is located between projections of two columns of drive electrodes of the plurality of drive electrodes adjacent to the each of the plurality of second sensing electrodes on the plane where the first substrate is located.

8. The microfluidic chip of claim 7, wherein a second pole of each of the plurality of transistors is connected to a respective one of the plurality of drive electrodes through a via hole, and each of the plurality of first electrodes and one of the plurality of drive electrodes corresponding to the each of the plurality of first electrodes form a storage capacitor; and
   the plurality of scan signal lines, the plurality of data signal lines, the plurality of first electrodes, and the plurality of transistors are located in a projection of the plurality of drive electrodes on the plane where the first substrate is located, and an edge of each of the plurality of scan signal lines, an edge of each of the plurality of data signal lines, and an edge of each of the plurality of drive electrodes are each bypass an edge of each of the plurality of transistors.

9. The microfluidic chip of claim 8, wherein at least two adjacent ones of the plurality of first electrodes are electrically connected, a connecting portion of two of the plurality of first electrodes electrically connected to each other comprises a hollow region, and the hollow region overlaps with at least one of each of the plurality of first sensing electrodes or each of the plurality of second sensing electrodes.

10. The microfluidic chip of claim 9, wherein the plurality of first sensing electrodes and the plurality of scan signal lines are disposed in a same layer, and the plurality of second sensing electrodes and the plurality of data signal lines are disposed in a same layer; and
the plurality of first electrodes and the plurality of first sensing electrodes are disposed in a same layer, and a connecting trace of the connecting portion of the two of the plurality of first electrodes electrically connected to each other extends along the first direction, or the plurality of first electrodes and the plurality of second sensing electrodes are disposed in a same layer, and a connecting trace of the connecting portion of the two of the plurality of first electrodes electrically connected to each other extends along the second direction.

11. The microfluidic chip of claim 1, wherein each of the plurality of first sensing electrodes comprises a first region and a second region and each of the plurality of second sensing electrodes comprises a first region and a second region, and the first region of each of the plurality of first sensing electrodes is insulated from and overlaps with the first region of one of the plurality of second sensing electrodes corresponding to the each of the plurality of first sensing electrodes; and
each of the plurality of first sensing electrodes and each of the plurality of second sensing electrodes satisfy at least one of the following: a width of the first region of each of the plurality of first sensing electrodes is less than a width of the second region of each of the plurality of first sensing electrodes; or a width of the first region of each of the plurality of second sensing electrodes is less than a width of the second region of each of the plurality of second sensing electrodes.

12. The microfluidic chip of claim 1, wherein detection signals are sequentially applied to the plurality of first sensing electrodes along the second direction at different times, or the detection signals are sequentially applied to the plurality of second sensing electrodes along the first direction at different times, and the position of the at least one droplet is determined according to the change in capacitance between one of the plurality of first sensing electrodes and an electrode corresponding to the one of the plurality of first sensing electrodes and the change in capacitance between one of the plurality of second sensing electrodes and an electrode corresponding to the one of the plurality of second sensing electrodes when the at least one droplet flows by.

13. The microfluidic chip of claim 1, wherein one of each of the plurality of first sensing electrodes or each of the plurality of second sensing electrodes is a transmission electrode, and the other one of each of the plurality of first sensing electrodes or each of the plurality of second sensing electrodes is a receiving electrode; and the position of the at least one droplet is determined according to a change in capacitance between one of the plurality of first sensing electrodes and one of the plurality of second sensing electrodes when the at least one droplet flows by.

14. The microfluidic chip of claim 1, further comprising a common electrode disposed on a side of the second substrate, wherein the position of the at least one droplet is determined according to a change in capacitance between one of the plurality of first sensing electrodes and the common electrode and a change in capacitance between one of the plurality of second sensing electrodes and the common electrode when the at least one droplet flows by.

15. The microfluidic chip of claim 14, wherein the common electrode comprises a plurality of branch electrodes extending along the first direction or the second direction, and a number of the plurality of branch electrodes is the same as a number of the plurality of first sensing electrodes or a number of the plurality of second sensing electrodes.

16. The microfluidic chip of claim 1, wherein a distance between two adjacent ones of the plurality of drive electrodes along the first direction is 10 μm to 40 μm; and
a distance between two adjacent ones of the plurality of drive electrodes along the second direction is 10 μm to 40 μm.

17. A microfluidic chip, comprising:
a first substrate and a second substrate disposed opposite to each other, wherein a microfluidic channel is formed between the first substrate and the second substrate and configured to accommodate at least one droplet; and
a plurality of drive electrodes, a plurality of first sensing electrodes and a plurality of second sensing electrodes disposed on a side of the first substrate, wherein the plurality of drive electrodes are arranged in an array, the plurality of first sensing electrodes extend along a first direction and are arranged along a second direction, the plurality of second sensing electrodes extend along the second direction and are arranged along the first direction, the first direction is parallel to a row direction of the array where the plurality of drive electrodes are arranged, the second direction is parallel to a column direction of the array where the plurality of drive electrodes are arranged, a projection of each of the plurality of first sensing electrodes on a plane where the first substrate is located at least partially overlaps with a projection of a slit of two rows of drive electrodes of the plurality of drive electrodes adjacent to the each of the plurality of first sensing electrodes on the plane where the first substrate is located, and a projection of each of the plurality of second sensing electrodes on the plane where the first substrate is located at least partially overlaps with a projection of a slit of two columns of drive electrodes of the plurality of drive electrodes adjacent to the each of the plurality of second sensing electrodes on the plane where the first substrate is located;
wherein different drive voltage signals are applied to adjacent drive electrodes of the plurality of drive electrodes, to drive the at least one droplet to move; and
a detection signal is applied to each of the plurality of first sensing electrodes and each of the plurality of second sensing electrodes, and a position of the at least one droplet is determined according to a change in capacitance between a first sensing electrode of the plurality of first sensing electrodes and an electrode corresponding to the first sensing electrode and a change in capacitance between a second sensing electrode of the plurality of second sensing electrodes and an electrode corresponding to the second sensing electrode when the at least one droplet flows by;

wherein the microfluidic chip further comprises a plurality of data signal lines extending along the first direction or the second direction, wherein each of the plurality of data signal lines is connected to a respective drive electrode of the plurality of drive electrodes;

wherein the plurality of data signal lines are disposed on a side of the plurality of drive electrodes farther away from the second substrate; and other drive electrodes disposed in a same row as a drive electrode of the plurality of drive electrodes connected to a corresponding data signal line of the plurality of data signal lines overlap with and are insulated from the corresponding data signal line.

18. The microfluidic chip of claim 17, wherein the plurality of data signal lines extend along the first direction, the plurality of first sensing electrodes and the plurality of data signal lines are disposed in a same layer, and the plurality of second sensing electrodes and the plurality of drive electrodes are disposed in a same layer; or the plurality of data signal lines extend along the second direction, the plurality of second sensing electrodes and the plurality of data signal lines are disposed in a same layer, and the plurality of first sensing electrodes and the plurality of drive electrodes are disposed in a same layer.

* * * * *